US012426063B2

(12) United States Patent
Gao et al.

(10) Patent No.: US 12,426,063 B2
(45) Date of Patent: Sep. 23, 2025

(54) PDCCH RELIABILITY ENHANCEMENTS WITH MULTIPLE TRPS

(71) Applicant: Telefonaktiebolaget LM Ericsson (publ), Stockholm (SE)

(72) Inventors: Shiwei Gao, Nepean (CA); Mattias Frenne, Uppsala (SE); Siva Muruganathan, Stittsville (CA); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 314 days.

(21) Appl. No.: 17/797,634

(22) PCT Filed: Feb. 4, 2021

(86) PCT No.: PCT/IB2021/050917
§ 371 (c)(1),
(2) Date: Aug. 4, 2022

(87) PCT Pub. No.: WO2021/156790
PCT Pub. Date: Aug. 12, 2021

(65) Prior Publication Data
US 2023/0156738 A1 May 18, 2023

Related U.S. Application Data

(60) Provisional application No. 62/970,492, filed on Feb. 5, 2020.

(51) Int. Cl.
*H04W 72/232* (2023.01)
*H04L 1/1607* (2023.01)
(Continued)

(52) U.S. Cl.
CPC ......... *H04W 72/232* (2023.01); *H04L 1/1607* (2013.01); *H04L 1/1816* (2013.01);
(Continued)

(58) Field of Classification Search
None
See application file for complete search history.

(56) References Cited

U.S. PATENT DOCUMENTS

| 9,924,502 B2 | 3/2018 | Choi et al. |
| 10,666,334 B2 | 5/2020 | Xiong et al. |
| (Continued) |

FOREIGN PATENT DOCUMENTS

| CN | 108352945 A | 7/2018 |
| CN | 110365458 A | 10/2019 |
| (Continued) |

OTHER PUBLICATIONS

CATT, "R1-1902019: Consideration on multi-TRP/panel transmission," 3GPP TSG RAN WG1 Meeting #96, Feb. 25-Mar. 1, 2019, Athens, Greece, 11 pages.
(Continued)

*Primary Examiner* — Clemence S Han
(74) *Attorney, Agent, or Firm* — Withrow & Terranova, PLLC

(57) ABSTRACT

Systems and methods are disclosed herein for improving the reliability of a physical downlink control channel (PDCCH) transmission and reception. In one embodiment, a method performed by a wireless communication device for reception of PDCCH repetitions over multiple control resource sets (CORESETs) in a cellular communications system comprises receiving a configuration of a first CORESET and a second CORESET. The method further comprises receiving, from one or more network nodes, a first repetition of a PDCCH carrying downlink control information (DCI) in the first CORESET and a second repetition of the PDCCH carrying the same DCI in the second CORESET, wherein the first and second repetitions of the PDCCH have either: (a) different channel encoding or (b) a same channel encoding. The method further comprises decoding the DCI based on
(Continued)

the first repetition of the PDCCH and/or the second repetition of the PDCCH.

29 Claims, 13 Drawing Sheets

(51) Int. Cl.
    *H04L 1/1812*     (2023.01)
    *H04L 1/1829*     (2023.01)
    *H04L 5/00*     (2006.01)

(52) U.S. Cl.
    CPC .......... *H04L 1/1854* (2013.01); *H04L 5/0007* (2013.01); *H04L 5/0053* (2013.01)

(56) References Cited

U.S. PATENT DOCUMENTS

| | | | |
|---|---|---|---|
| 11,601,824 | B2 | 3/2023 | Hamidi-Sepehr et al. |
| 2011/0235601 | A1 | 9/2011 | Yoo et al. |
| 2013/0252606 | A1 | 9/2013 | Nimbalker et al. |
| 2018/0279360 | A1 | 9/2018 | Park et al. |
| 2019/0182807 | A1* | 6/2019 | Panteleev ............. H04L 5/0048 |
| 2019/0222357 | A1 | 7/2019 | Huang et al. |
| 2019/0222400 | A1* | 7/2019 | Bagheri ................ H04L 5/0082 |
| 2019/0253308 | A1 | 8/2019 | Huang et al. |
| 2019/0253904 | A1 | 8/2019 | Tsai et al. |
| 2019/0305909 | A1 | 10/2019 | Chien et al. |
| 2019/0373450 | A1 | 12/2019 | Zhou et al. |
| 2020/0008235 | A1 | 1/2020 | Sarkis et al. |
| 2020/0052844 | A1 | 2/2020 | Yu et al. |
| 2020/0100154 | A1 | 3/2020 | Cirik et al. |
| 2020/0106559 | A1* | 4/2020 | Vilaipornsawai ..... H04L 1/1896 |
| 2020/0145062 | A1 | 5/2020 | Jung et al. |
| 2020/0153497 | A1 | 5/2020 | Tsai et al. |
| 2020/0153572 | A1 | 5/2020 | Tsai et al. |
| 2020/0154467 | A1* | 5/2020 | Gong .................... H04W 76/27 |
| 2020/0314858 | A1 | 10/2020 | Xu et al. |
| 2020/0351896 | A1* | 11/2020 | Taherzadeh Boroujeni ................ H04L 5/001 |
| 2021/0028843 | A1 | 1/2021 | Zhou et al. |
| 2021/0058971 | A1 | 2/2021 | MolavianJazi et al. |
| 2021/0119688 | A1 | 4/2021 | Enescu et al. |
| 2021/0144744 | A1 | 5/2021 | Zhou et al. |
| 2021/0184738 | A1 | 6/2021 | Bai et al. |
| 2021/0195600 | A1* | 6/2021 | Khoshnevisan ...... H04W 72/53 |
| 2021/0226820 | A1 | 7/2021 | Khoshnevisan et al. |
| 2021/0227418 | A1 | 7/2021 | Hwang et al. |
| 2021/0227525 | A1 | 7/2021 | Khoshnevisan et al. |
| 2021/0320753 | A1* | 10/2021 | Shimezawa ........... H04L 1/1816 |
| 2021/0321446 | A1* | 10/2021 | Lee ....................... H04W 72/54 |
| 2021/0329611 | A1* | 10/2021 | Karjalainen .......... H04W 48/12 |
| 2022/0038207 | A1* | 2/2022 | Frenne .................. H04L 1/0072 |
| 2023/0040433 | A1 | 2/2023 | Zhang et al. |
| 2024/0031067 | A1* | 1/2024 | Gao .......................... H04L 1/08 |

FOREIGN PATENT DOCUMENTS

| | | |
|---|---|---|
| CN | 110535570 A | 12/2019 |
| CN | 111106914 A | 5/2020 |
| EP | 3809650 A1 | 4/2021 |
| WO | 2018045092 A1 | 3/2018 |
| WO | 2018228487 A1 | 12/2018 |
| WO | 2019139955 A1 | 7/2019 |
| WO | 201924422 A1 | 12/2019 |
| WO | 2019244223 A1 | 12/2019 |
| WO | 2020033549 A1 | 2/2020 |
| WO | 2020033647 A1 | 2/2020 |
| WO | 2020054036 A1 | 3/2020 |
| WO | 2020064512 A1 | 4/2020 |
| WO | 2020080916 A1 | 4/2020 |
| WO | 2020098737 A1 | 5/2020 |
| WO | 2020153809 A1 | 7/2020 |

OTHER PUBLICATIONS

Ericsson, "R1-2004633: High Level Views on Rel-17 feMIMO," 3GPP TSG-RAN WG1 Meeting #101-e, May 25-Jun. 5, 2020, Electronic Meeting, 13 pages.
Ericsson, "R1-2006367: On PDCCH, PUCCH and PUSCH robustness," 3GPP TSG-RAN WG1 Meeting #102, Aug. 17-28, 2020, 3GPP TSG-RAN WG1 Meeting #102, Aug. 17-28, 2020, Electronic Meeting 12 pages.
NTT Docomo, Inc., "R1-1900969: PDCCH enhancement for URLLC," 3GPP TSG RAN WG1 Ad-Hoc Meeting 1901, Jan. 21-25, 2019, Taipei, Taiwan, 10 pages.
Qualcomm Incorporated, "R2-2003252: Correction on new DL MIMO MAC CE," 3GPP TSG-RAN WG2 Meeting #109-bis-e, Apr. 20-30, 2020, Electronic Meeting, 10 pages.
Examination Report for European Patent Application No. 21729016.2, mailed Mar. 27, 2024, 5 pages.
Examination Report for European Patent Application No. 21733556.1, mailed Mar. 13, 2024, 4 pages.
Notice of Reasons for Refusal for Japanese Patent Application No. 2022-576204, mailed Mar. 18, 2024, 6 pages.
Decision to Grant for Japanese Patent Application No. 2023-507890, mailed Apr. 2, 2024, 31 pages.
Intel Corporation, "R2-2106645: [AT114-e][035][feMIMO] TCI states indication for PDCCH," 3GPP TSG-RAN WG2 #114-e, May 19-27, 2021, Electronic Meeting, 6 pages.
Decision to Grant for Japanese Patent Application No. 2022-576204, mailed Aug. 9, 2024, 7 pages.
Notice of Allowance for U.S. Appl. No. 17/279,656, mailed Aug. 22, 2024, 7 pages.
Author Unknown, "Technical Specification Group Radio Access Network; NR; Physical channels and modulation (Release 16)," Technical Specification 38.211, Version 16.0.0, Dec. 2019, 3GPP Organizational Partners, 129 pages.
Author Unknown, "Technical Specification Group Radio Access Network; NR; Multiplexing and channel coding (Release 16)," Technical Specification 38.212, Version 16.0.0, Dec. 2019, 3GPP Organizational Partners, 145 pages.
Author Unknown, "Technical Specification Group Radio Access Network; NR; Physical layer procedures for control (Release 16)," Technical Specification 38.213, Version 16.1.0, Mar. 2020, 3GPP Organizational Partners, 156 pages.
CATT, "R1-1900339: Consideration on multi-TRP/panel transmission," 3GPP TSG RAN WG1 Ad-Hoc Meeting 1901, Jan. 21-25, 2019, Taipei, Taiwan, 14 pages.
CATT, "R1-1904561: Consideration on multi-TRP/panel transmission," 3GPP TSG RAN WG1 #96bis, Apr. 8-12, 2019, Xi'an, China, 14 pages.
Nokia, et al., "R1-1813489: Enhancements on Multi-TRP/Panel Transmission," 3GPP TSG RAN WG1 Meeting #95, Nov. 12-16, 2018, Spokane, Washington, 18 pages.
Spreadtrum Communications, "R1-1900711: Discussion on Multi-TRP transmission," 3GPP TSG RAN WG1 Meeting #AH1901, Jan. 21-25, 2019, Taipei, Taiwan, 6 pages.
Invitation to Pay Additional Fees and Partial Search for International Patent Application No. PCT/IB2021/054465, mailed Jul. 20, 2021, 27 pages.
International Search Report and Written Opinion for International Patent Application No. PCT/IB2021/054465, mailed Sep. 17, 2021, 28 pages.
Author Unknown, "Technical Specification Group Radio Access Network; NR; Physical channels and modulation (Release 16)," Technical Specification 38.211, Version 16.1.0, Mar. 2020, 3GPP Organizational Partners, 130 pages.
Author Unknown, "Technical Specification Group Radio Access Network; NR; Multiplexing and channel coding (Release 16)," Technical Specification 38.212, Version 16.1.0, Mar. 2020, 3GPP Organizational Partners, 146 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.

(56) References Cited

OTHER PUBLICATIONS

Author Unknown, "Technical Specification Group Radio Access Network; NR: Medium Access Control (MAC) protocol specification (Release 16)," Technical Specification 38.321, Version 16.0.0, Mar. 2020, 3GPP Organizational Partners, 141 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
ZTE, "R1-1906244: Considerations on beam management for multi-TRP," 3GPP TSG RAN WG1 #97, May 13-17, 2019, Reno, Nevada, 7 pages.
ZTE, et al., "R2-2001465: Consideration on TCI state MAC CE for mTRP mPDCCH transmissions," 3GPP TSG-RAN WG2 #108, Feb. 14, 2020, 4 pages.
International Search Report and Written Opinion for International Patent Application No. PCT/IB2021/055182, mailed Sep. 21, 2021, 22 pages.
International Preliminary Report on Patentability for International Patent Application No. PCT/IB2021/055182, mailed May 30, 2022, 28 pages.
Author Unknown, "Technical Specification Group Radio Access Network; NR; Requirements for support of radio resource management (Release 15)," Technical Specification 38.133, Version 15.10.0, Jun. 2020, 3GPP Organizational Partners, 1,161 pages.
Ericsson, "R4-2007382: Transmission scheme in NR PDSCH demodulation requirements for HST," 3GPP TSG-RAN WG4 Meeting #95-e, May 25-Jun. 5, 2020, Electronic Meeting, 3 pages.
Huawei, et al., "R4-1912745: Further discussion on scenarios and transmission schemes for NR Rel-16 HST," 3GPP TSG-RAN WG4 Meeting #92Bis, Oct. 14-18, 2019, Chongqing, China, 4 pages.
Xiaomi, "R1-1902865: Enhancements on Multi-TRP/Panel Transmission," 3GPP TSG RAN WG1 #96, Feb. 25-Mar. 1, 2019, Athens, Greece, 4 pages.
International Search Report and Written Opinion for International Patent Application No. PCT/IB2021/057104, mailed Oct. 26, 2021, 14 pages.
Written Opinion for International Patent Application No. PCT/IB2021/057104, mailed Aug. 31, 2022, 6 pages.
International Preliminary Report on Patentability for International Patent Application No. PCT/IB2021/057104, mailed Nov. 22, 2022, 18 pages.
Ericsson, "R1-2004432: Remaining issues on Multi-TRP/Panel Transmission," 3GPP TSG-RAN WG1 Meeting #101-e, May 25-Jun. 5, 2020, Electronic Meeting, 22 pages.
Samsung, "R1-2003918: On Rel.17 FeMIMO WI," 3GPP TSG RAN WG1 #101, May 25-Jun. 5, 2020, Electronic Meeting, 12 pages.
Vivo, "R1-1717483: NR PDCCH structure," 3GPP TSG RAN WG1 Meeting #90bis, Oct. 9-13, 2017, Prague, Czech Republic, 10 pages.
Notice of Reasons for Rejection for Japanese Patent Application No. 2022-570273, mailed Dec. 5, 2023, 10 pages.
Examination Report No. 1 for Australian Patent Application No. 2021288808, mailed Jul. 7, 2023, 2 pages.
Non-Final Office Action for U.S. Appl. No. 17/279,656, mailed Dec. 7, 2023, 18 pages.
Author Unknown, "Technical Specification Group Radio Access Network; NR; Physical layer procedures for control (Release 15)," Technical Specification 38.213, Version 15.4.0, Dec. 2018, 3GPP Organizational Partners, 104 pages.
Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.
Ericsson, "R1-1909423: Preliminary results on PDCCH over multi-TRP for URLLC," 3GPP TSG RAN WG1 Meetin RAN1#98, Aug. 26-30, 2019, Prague, Czech Republic, 4 pages.
NTT Docomo, et al., "R1-1911184: Enhancements on multi-TRP/panel transmission," 3GPP TSG RAN WG1 #98bis, Oct. 14-20, 2019, Chongqing, China, 32 pages.
International Search Report and Written Opinion for International Patent Application No. PCT/IB2021/050917, mailed May 10, 2021, 15 pages.
Author Unknown, "Technical Specification Group Radio Access Network; NR; Physical channels and modulation (Release 15)," Technical Specification 38.211, Version 15.6.0, Jun. 2019, 3GPP Organizational Partners, 97 pages.
Author Unknown, "Technical Specification Group Radio Access Network; NR; Physical layer procedures for control (Release 15)," Technical Specification 38.213, Version 1.0.2, Oct. 2017, 3GPP Organizational Partners, 23 pages.
Author Unknown, "Technical Specification Group Radio Access Network; NR; Radio Resource Control (RRC) protocol specification (Release 15)," Technical Specification 38.331, Version 15.1.0, Mar. 2018, 3GPP Organizational Partners, 268 pages.
CATT, "R1-1801750: Discussion on enhanced PDCCH for NR URLLC," 3GPP TSG RAN WG1 Meeting #92, Feb. 26-Mar. 2, 2018, 4 pages.
Ericsson, "R1-1900728: On multi-TRP and multi-panel," 3GPP TSG RAN WG1 Meeting Ad-Hoc Meeting 1901, Jan. 21-25, 2019, Taipei, Taiwan, 9 pages.
NTT Docomo, et al., "R1-1805063: Necessity of PDCCH repitition," 3GPP TSG RAN WG1 Meeting #92bis, Apr. 16-20, 2018, Sanya, China, 6 pages.
Vivo, "R1-1803847: Discussion on PDCCH repetition for URLLC," 3GPP TSG RAN WG1 Meeting #92bis, Apr. 16-20, 2018, Sanya, China, 6 pages.
International Search Report and Written Opinion for International Patent Application No. PCT/EP2019/075223, mailed Jan. 8, 2020, 10 pages.
Li, Xiaowen, et al., "Implementation of DCI Format Detection and Transmission Scheme Confirmation of PDSCH in LTE System," Television Technology, vol. 17, Sep. 2, 2013, 6 pages.

\* cited by examiner

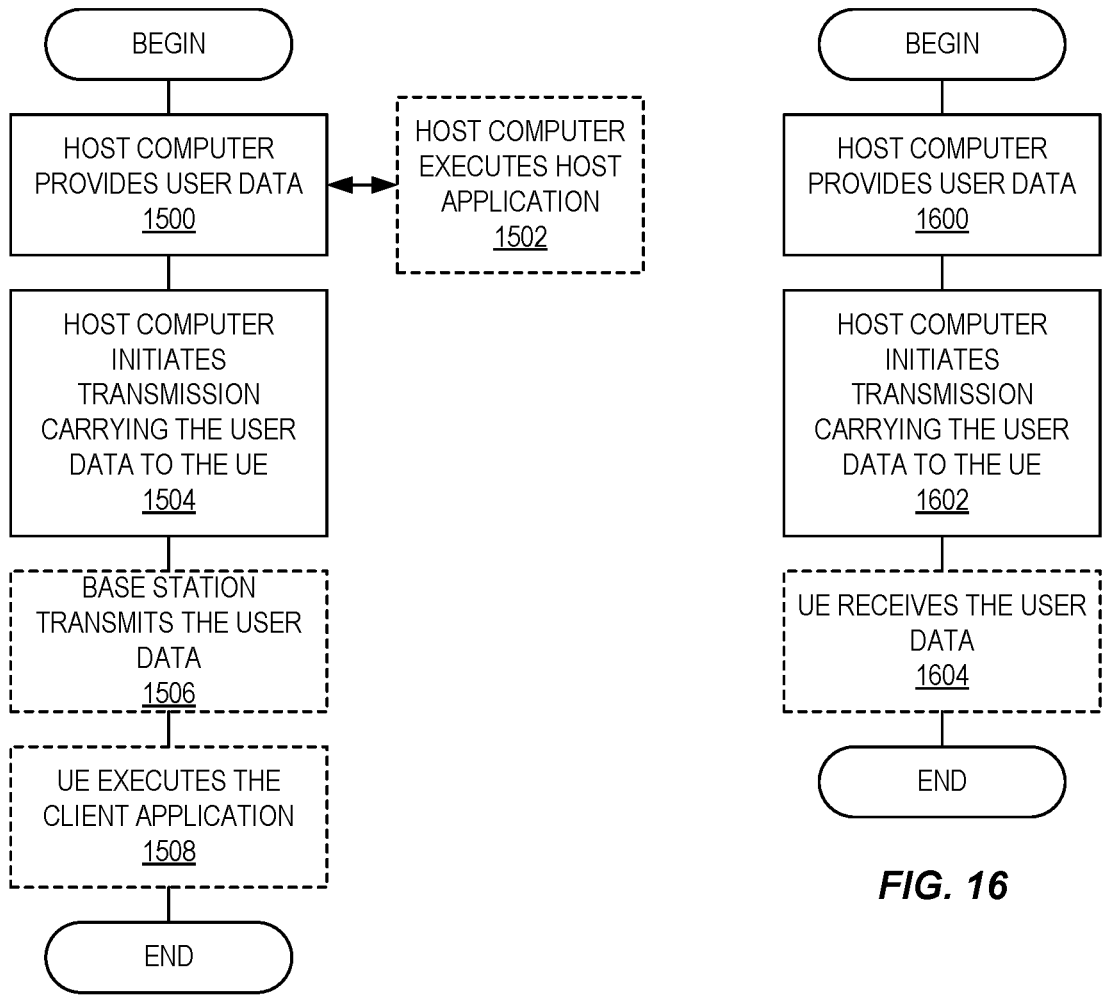

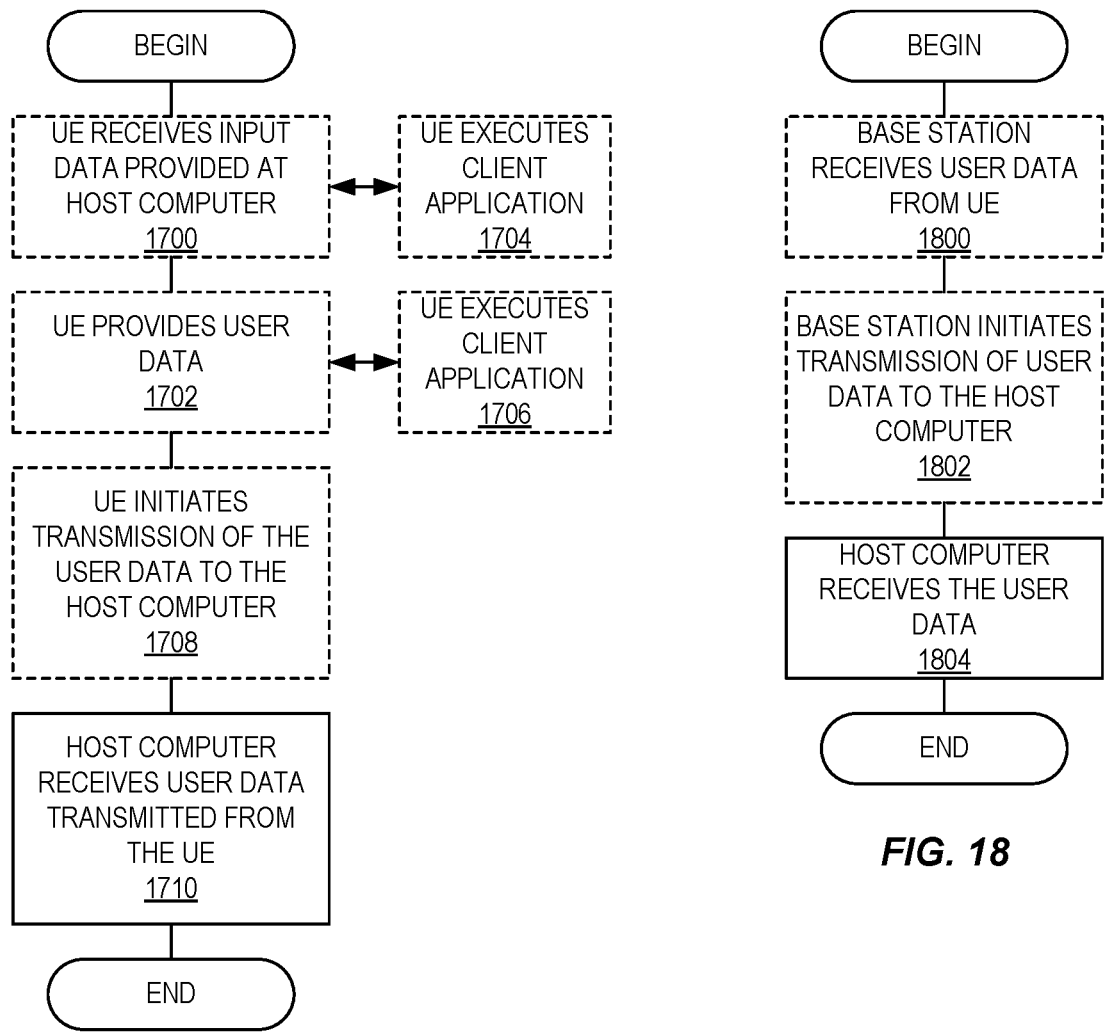

PDCCH RELIABILITY ENHANCEMENTS WITH MULTIPLE TRPS

RELATED APPLICATIONS

This application is a 35 U.S.C. § 371 national phase filing of International Application No. PCT/IB2021/050917, filed Feb. 4, 2021, which claims the benefit of provisional patent application Ser. No. 62/970,492, filed Feb. 5, 2020, the disclosures of which are hereby incorporated herein by reference in their entireties.

TECHNICAL FIELD

The present disclosure relates to transmission of a Physical Downlink Control Channel (PDCCH) in a Radio Access Network (RAN) of a cellular communications system.

BACKGROUND

NR Frame Structure and Resource Grid

Third Generation Partnership Project (3GPP) New Radio (NR) uses Cyclic Prefix Orthogonal Frequency Division Multiplexing (CP-OFDM) in both downlink (i.e., from a network node, NR base station (gNB), or base station, to a User Equipment (UE)) and uplink (i.e., from UE to gNB). Discrete Fourier Transform (DFT) spread Orthogonal Frequency Division Multiplexing (OFDM) is also supported in the uplink. In the time domain, NR downlink and uplink are organized into equally-sized subframes of 1 millisecond (ms) each. A subframe is further divided into multiple slots of equal duration. The slot length depends on subcarrier spacing. For subcarrier spacing of $\Delta f=15$ kHz, there is only one slot per subframe and each slot consists of fourteen (14) OFDM symbols.

Data scheduling in NR is typically on a slot basis. An example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15 \times 2^\mu)$ kHz where $\in 0,1,2,3,4 \neq \Delta f=15$ kHz is the basic subcarrier spacing. The slot durations at different subcarrier spacings is given by $$\frac{1}{2^\mu} \text{ ms.}$$

In the frequency domain, a system bandwidth is divided into Resource Blocks (RBs), each corresponding to twelve (12) contiguous subcarriers. The RBs are numbered starting with zero (0) from one end of the system bandwidth. The basic NR physical time-frequency resource grid is illustrated in FIG. 2, where only one resource block (RB) within a 14-symbol slot is shown. One OFDM subcarrier during one OFDM symbol interval forms one resource element (RE).

Downlink transmissions are dynamically scheduled, i.e., in each slot the gNB transmits Downlink Control Information (DCI) over Physical Downlink Control Channel (PDCCH) about which UE data is to be transmitted to and which RBs in the current downlink slot the data is transmitted on. The UE data are carried on PDSCH.

There are three DCI formats defined for scheduling PDSCH in NR, i.e., DCI formats 1_0,1_1, and 1_2. DCI format 1_0 has a smaller size than DCI 1_1 and can be used when a UE is not fully connected to the network while DCI format 1_1 can be used for scheduling Multiple-Input-Multiple-Output (MIMO) transmissions with two Transport Blocks (TBs). DCI format 1_2 is further introduced in NR Release 16 for scheduling PDSCH with different priorities, in which a priority indicator is included.

QCL and TCI States

Several signals can be transmitted from different antenna ports of a same base station. These signals can have the same large-scale properties such as Doppler shift/spread, average delay spread, or average delay. These antenna ports are then said to be Quasi Co-Located (QCL).

If the UE knows that two antenna ports are QCL with respect to a certain parameter (e.g., Doppler spread), the UE can estimate that parameter based on one of the antenna ports and apply that estimate for receiving signal on the other antenna port. Typically, the first antenna port is represented by a measurement reference signal such as Channel State Information Reference Signal (CSI-RS) or Synchronization Signal Block (SSB) (known as source Reference Signal (RS)) and the second antenna port is a Demodulation Reference Signal (DMRS) (known as target RS).

For instance, if antenna ports A and B are QCL with respect to average delay, the UE can estimate the average delay from the signal received from antenna port A and assume that the signal received from antenna port B has the same average delay. This is useful for demodulation since the UE can know beforehand the properties of the channel, which for instance helps the UE in selecting an appropriate channel estimation filter.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread},
Type B: {Doppler shift, Doppler spread},
Type C: {average delay, Doppler shift}, and
Type D: {Spatial Rx parameter}.

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them.

For dynamic beam and Transmission/Reception Point (TRP) selection, a UE can be configured through Radio Resource Control (RRC) signaling with up to 128 Transmission Configuration Indicator (TCI) states for PDSCH in Frequency Range 2 (FR2) and up to 8 TCI states in Frequency Range 1 (FR1), depending on UE capability.

Each TCI state contains QCL information, i.e. one or two source downlink (DL) RSs, each source RS associated with a QCL type. For example, a TCI state contains a pair of reference signals, each associated with a QCL type, e.g. two different CSI-RSs {CSI-RS1, CSI-RS2} is configured in the TCI state as {qcl-Type1,qcl-Type2}={Type A, Type D}. This means the UE can derive Doppler shift, Doppler spread, average delay, delay spread from CSI-RS1 and Spatial Rx parameter (i.e., the RX beam to use) from CSI-RS2.

The list of TCI states can be interpreted as a list of possible beams transmitted from the network or a list of possible TRPs used by the network to communicate with the UE.

For PDSCH transmission, up to 8 TCI states or pairs of TCI states may be activated by a Medium Access Control (MAC) Control Element (CE), and a UE may be dynamically indicated by a TCI codepoint in DCI one or two of the activated TCI states for PDSCH reception. The UE uses the TCI-State according to the value of the 'Transmission Configuration Indication' field in the detected PDCCH with DCI for determining PDSCH antenna port quasi co-location.

If each of all the TCI codepoints is mapped to a single TCI state by a MAC CE and the offset between the reception of a DL DCI and the corresponding PDSCH is less than a threshold timeDurationForQCLconfigured by higher layers, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest CORESET-ID in the latest slot in which one or more CORESETs within the active bandwidth part (BWP) of the serving cell are monitored by the UE.

If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

CORESET and Search Space

A UE monitors a set of PDCCH candidates in one or more Control Resource Sets (CORESETs) on an active DL BWP on each activated serving cell configured with PDCCH monitoring according to corresponding search space sets, where monitoring implies decoding each PDCCH candidate according to the monitored DCI formats. A PDCCH candidate can occupy one or more Control-Channel Elements (CCEs), also referred to Aggregation Levels (ALs), as indicated in Table 1 below. A CCE consists of six (6) Resource-Element Groups (REGs), where a REG equals one RB during one OFDM symbol.

TABLE 1

NR supported PDCCH aggregation levels.

| Aggregation level | Number of CCEs |
| --- | --- |
| 1 | 1 |
| 2 | 2 |
| 4 | 4 |
| 8 | 8 |
| 16 | 16 |

A set of PDCCH candidates for a UE to monitor is defined in terms of PDCCH search space sets. A search space set can be a Common Search Space (CSS) set or a UE Specific Search Space (USS) set. A UE can be configured with up to ten (10) sets of search spaces per BWP for monitoring PDCCH candidates.

A search space set is defined over a CORESET. A CORESET consists of $N_{RB}^{CORESET}$ resource blocks in the frequency domain and $N_{Symb}^{CORESET} \in \{1,2,3\}$ consecutive OFDM symbols in the time domain. For each DL BWP configured to a UE in a serving cell, a UE can be provided by higher layer signaling with P≤5 CORESETs. For each CORESET, a UE is configured by RRC signaling with CORESET Information Element (IE), which includes the following information:

a CORESET index p, 0≤p<16;
a DM-RS scrambling sequence initialization value;
a precoder granularity for a number of resource element groups (REGs) in the frequency domain where the UE can assume use of a same DM-RS precoder;
a number of consecutive symbols;
a set of RBs;
CCE-to-REG mapping parameters;
a list of up to 64 TCI-States can be configured in a CORESET p. These TCI states are used to provide QCL relationships between the source DL RS(s) in one RS Set in the TCI State and the PDCCH DMRS ports (i.e., for DMRS ports for PDCCHs received in one of the search spaces defined over CORESET p). The source DL RS(s) can either be a CSI-RS or SSB;
an indication for a presence or absence of a transmission configuration indication (TCI) field for DCI format 1_1 transmitted by a PDCCH in CORESET p. This is done by the field 'tci-PresentInDCI'. In the 'tci-PresentInDCI' field is absent in the CORESET IE corresponding to CORESET p, then the UE considers the TCI field to be absent/disabled when scheduling is done via DCI format 1_1. The corresponding field for indicating a presence or absence of a TCI field for DCI format 1_2 is given by 'tci-PresentInDCI-ForDCIFormat1_2'.

For each CORESET, only one TCI state is activated by Medium Access Control (MAC) Control Element (CE). For each DL BWP configured to a UE in a serving cell, the UE is provided by higher layers with S≤10 search space sets where, for each search space set from the S search space sets, the UE is provided the following by higher layers:

a search space set index s, 0≤s<40
an association between the search space set s and a CORESET p
a PDCCH monitoring periodicity of $k_s$ slots and a PDCCH monitoring offset of $o_s$ slots
a PDCCH monitoring pattern within a slot, indicating first symbol(s) of the CORESET within a slot for PDCCH monitoring
a duration of $T_s<k_s$ slots indicating a number of slots that the search space set s exists
a number of PDCCH candidates $M_s^{(L)}$ per CCE aggregation level L
an indication that search space set s is either a CSS set or a USS set
DCI formats to monitoring For search space set s, the UE determines that a PDCCH monitoring occasion(s) exists in a slot with slot number $n_{s,f}^{\mu}$ in a frame with frame number $n_f$ if $(n_f N_{slot}^{frame,\mu} + n_{s,f}^{\mu} - o_s)$ mod $k_s = 0$. The UE monitors PDCCH for search space set s for $T_s$ consecutive slots, starting from slot $n_{s,f}^{\mu}$, and does not monitor PDCCH for search space set s for the next $k_s - T_s$ consecutive slots.

A UE first detects and decodes PDCCH and, if the decoding is successful, it then decodes the corresponding PDSCH based on the decoded control information in the PDCCH.

Uplink data transmissions are also dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc. There are three DCI formats defined for scheduling PUSCH in NR, i.e., DCI formats 0_0, 0_1, and 0_2. DCI format 0_0 has a smaller size than DCI 0_1 and can be used when a UE is not fully connected to the network. DCI format 1_2 is further introduced in NR Rel-16 for scheduling PUSCH with different priorities, in which a priority indicator is included.

NR HARQ ACK/NACK Feedback Over PUCCH

When receiving a PDSCH in the downlink from a serving gNB at slot n, a UE feeds back a Hybrid Automatic Repeat Request (HARQ) Acknowledgement (ACK) at slot n+k over a Physical Uplink Control Channel (PUCCH) resource in the uplink to the gNB if the PDSCH is decoded successfully. Otherwise, the UE sends a HARQ Negative ACK (NACK) at slot n+k to the gNB to indicate that the PDSCH is not decoded successfully.

In NR, up to four PUCCH resource sets can be configured to a UE. A PUCCH resource set with pucch-ResourceSetId=0 can have up to thirty-two (32) PUCCH resources while, for PUCCH resource sets with pucch-ResourceSetId=1 to 3, each set can have up to eight (8) PUCCH resources. A UE determines the PUCCH resource set in a slot based on the number of aggregated Uplink Control Information (UCI) bits to be sent in the slot. The UCI bits consist of HARQ ACK/NACK, Scheduling Request (SR), and Channel State Information (CSI) bits.

A 3-bit PUCCH resource Indicator (PRI) field in DCI maps to a PUCCH resource in a set of PUCCH resources with a maximum of eight PUCCH resources. For the first set of PUCCH resources with pucch-ResourceSetId=0 and when the number of PUCCH resources, $R_{PUCCH}$, in the set is larger than eight, the UE determines a PUCCH resource with index $r_{PUCCH}$, $0 \leq r_{PUCCH} \leq R_{PUCCH}-1$, for carrying HARQ-ACK information in response to detecting a last DCI format 1_0 or DCI format 1_1 in a PDCCH reception, among DCI formats 1_0 or DCI formats 1_1 the UE received with a value of the PDSCH-to-HARQ_feedback timing indicator field indicating a same slot for the PUCCH transmission, as $$r_{PUCCH} = \begin{cases} \left\lfloor \frac{n_{CCE,p} \cdot \left\lfloor \frac{R_{PUCCH}}{8} \right\rfloor}{N_{CCE,p}} \right\rfloor + \\ \Delta_{PRI} \cdot \left\lfloor \frac{R_{PUCCH}}{8} \right\rfloor \text{ if } \Delta_{PRI} < R_{PUCCH} \bmod 8 \\ \left\lfloor \frac{n_{CCE,p} \cdot \left\lfloor \frac{R_{PUCCH}}{8} \right\rfloor}{N_{CCE,p}} \right\rfloor + \Delta_{PRI} \cdot \left\lfloor \frac{R_{PUCCH}}{8} \right\rfloor + \\ R_{PUCCH} \bmod 8 \text{ if } \Delta_{PRI} \geq R_{PUCCH} \bmod 8 \end{cases}$$

where $N_{CCE,p}$ is a number of CCEs in CORESET p of the PDCCH reception for the DCI format 1_0 or DCI format 1_1 as described in Subclause 10.1 of 3GPP TS 38.213 v15.4.0, $n_{CCE,p}$ is the index of a first CCE for the PDCCH reception, and $\Delta_{PRI}$ is a value of the PUCCH resource indicator field in the DCI format 1_0 or DCI format 1_1.

Ultra-Reliable Low Latency (URLLC) Data Transmission Over Multiple Transmission Points Reliable PDSCH transmission with multiple panels or TRPs has been introduced in 3GPP for NR Release 16, in which a transport block may be transmitted over multiple TRPs to achieve diversity. Reliability is achieved by transmitting different layers of an encoded codeword (CW) for the TB on the same resource over two TRPs (Scheme 1a), or different parts of a CW on different frequency resources over two TRPs (Scheme 2a), or by repeating the same TB over two TRPs in time (Schemes 3 and 4) or frequency domain (Scheme 2b). For this purpose, two TCI states are indicated in a DCI scheduling the PDSCH.

In NR Release 17, it has been proposed to further introduce PDCCH enhancement with multiple TRPs by repeating a PDCCH from different TRPs as shown in FIG. 3. FIG. 3 shows an example of PDCCH transmission from multiple TRPs for increasing reliability.

Three methods were proposed in R1-1911184, "Enhancements on multi-TRP/panel transmission", NTT DOCOMO, 3gpp RAN1 #98bis, Chongqing, China, Oct. 14-20, 2019 and R1-1909423, "Preliminary results on PDCCH over multi-TRP for URLLC", Ericsson, 3GPP RAN1 #98, Prague, Czech Republic, 26th-30 Aug. 2019. These three methods are:
1. CCE interleaving:
   a PDCCH with aggregation level L is mapped to two CORESETs each associated with one TRP with half of the PDCCH symbols mapped to the same L/2 CCEs in each of the two CORESETs
2. PDCCH repetition without soft combining
   A PDCCH is repeated over two CORESETs each associated with one TRP, the PDCCH is considered successfully decoded if any one repetition is decoded successfully. No soft combining is performed at the UE
3. PDCCH repetition with soft combining
   A PDCCH is repeated over two CORESETs each associated with one TRP, soft combining is performed before PDCCH decoding It is shown in R1-1911184 and R1 that, in the presence of channel blocking or deep fading, all three multi-TRP schemes provide better Block Error Rate (BLER) performance than single TRP. In absence of channel blocking or deep fading, CCE interleaving and PDCCH repetition with soft combining provide better BLER performance than single TRP while PDCCH repetition without soft combining performs similar as single TRP.

For DCI format 1_2 for URLLC PDSCH scheduling, it has been agreed in Release 16 to introduce a new reference point for the time domain resource allocation of PDSCH:
For time domain resource allocation indication for PDSCH for Rel-16 URLLC in DCI format 1_2, using the starting symbol $S_0$ of the PDCCH monitoring occasion in which the DL assignment is detected as the reference of the SLIV is supported.
A RRC parameter is used to enable the utilization of the new reference
When the RRC parameter enables the utilization of the new reference $S_0$, the new reference $S_0$ is applied for TDRA entries with $K_0=0$ (i.e., slot offset 0).
For other entries (if any) in the same TDRA table, the reference is slot boundary as in Rel-15.

PDSCH mapping type A is not supported with the new reference. In Rel. 15, the reference point is the first symbol in the slot, while for this new DCI format, the reference point is instead the starting symbol of the PDCCH monitoring occasions, which can be different from the first symbol of the slot, especially for Type B scheduling, see Table 1.

SUMMARY

Systems and methods are disclosed herein for improving the reliability of a physical downlink control channel (PDCCH) transmission and reception. In one embodiment, a method performed by a wireless communication device for reception of PDCCH repetitions over multiple control resource sets (CORESETs) in a cellular communications system comprises receiving a configuration of a first CORESET and a second CORESET. The method further comprises receiving, from one or more network nodes, a first repetition of a PDCCH carrying downlink control information (DCI) in the first CORESET and a second repetition of the PDCCH carrying the same DCI in the second CORESET, wherein the first and second repetitions of the PDCCH have either: (a) different channel encoding or (b) a same channel encoding. The method further comprises decoding the DCI based on the first repetition of the PDCCH and/or the second repetition of the PDCCH. In this manner, a way to link resources of two or more PDCCH repetitions is provided.

In one embodiment, the first and the second repetitions of the PDCCH are transmitted in first control channel elements (CCEs) of the first CORSET and second CCEs of the second CORESET, respectively. In one embodiment, the first and the second CCEs have a one-to-one mapping. In another embodiment, the first and the second CCEs have the same CCE indices. In another embodiment, the first and the second CCEs have different CCE indices.

In one embodiment, each of the first and the second CORESETs comprises a number of orthogonal frequency division multiplexing (OFDM) symbols in time domain and a number of resource blocks in frequency domain.

In one embodiment, the first and the second CORESETs are multiplexed either in time, frequency, or a combination of both time and frequency.

In one embodiment, receiving the first repetition of the PDCCH in the first CORESET and the second repetition of the PDCCH in the second CORESET comprises receiving the first repetition of the PDCCH in the first CORESET from a first network node and receiving the second repetition of the PDCCH in the second CORESET from a second network node. In one embodiment, the first CORESET is associated with a first TCI state, the second CORESET is associated with a second TCI state, and the first TCI state may be the same or different from the second TCI state. In one embodiment, the first and the second network nodes are associated with the first and the second TCI states, respectively.

In one embodiment, receiving the first repetition of the PDCCH in the first CORESET and the second repetition of the PDCCH in the second CORESET comprises receiving the first repetition of the PDCCH in the first CORESET and the second repetition of the PDCCH in the second CORESET on different beams from a single network node. In one embodiment, the first CORESET is associated with a first TCI state, the second CORESET is associated with a second TCI state, and the first TCI state may be the same or different from the second TCI state.

In one embodiment, either a physical downlink shared channel (PDSCH) or a physical uplink shared channel (PUSCH) is scheduled by the DCI. In one embodiment, the method further comprises determining a time offset between reception of the DCI and the scheduled PDSCH or PUSCH. In one embodiment, the time offset is between: (a) a last symbol in time from among all symbols of the first repetition of the PDCCH and the second repetition of the PDCCH and (b) a first symbol in time of the scheduled PDSCH or PUSCH. In one embodiment, the method further comprises determining a reference symbol from among the first repetition of the PDCCH and the second repetition of the PDCCH for the scheduled PDSCH or PUSCH. In one embodiment, the reference symbol is a first symbol of one of the first repetition of the PDCCH and the second repetition of the PDCCH that starts at a same time or later in time. In one embodiment, the reference symbol is a first symbol of one of the first repetition of the PDCCH and the second repetition of the PDCCH in one of the first and the second CORESETs having a lowest CORESET index.

In one embodiment, either a channel state information reference signal (CSI-RS) or a sounding reference signal (SRS) is triggered by the DCI. In one embodiment, the method further comprises determining a time offset between reception of the DCI and the triggered CSI-RS or SRS. In one embodiment, the time offset is between: (a) a last symbol in time from among all symbols of the first repetition of the PDCCH and the second repetition of the PDCCH and (b) the corresponding one of the CSI-RS or SRS.

In one embodiment, a PDSCH is scheduled by the DCI, and the method further comprises determining a physical uplink control channel (PUCCH) resource in a PUCCH resource set for carrying a Hybrid Automatic Repeat Request (HARQ) ACK or NACK associated with the scheduled PDSCH, wherein the PUCCH resource set has more than eight PUCCH resources. In one embodiment, determining the PUCCH resource comprises determining an index of a first CCE over which the first PDCCH or second PDCCH is transmitted and a total number of CCEs in the first CORESET or the second CORESET over which the first PDCCH or second PDCCH is transmitted.

In one embodiment, the first repetition of the PDCCH and the second repetition of the PDCCH are identical. In another embodiment, the first repetition of the PDCCH is different from the second repetition of the PDCCH.

In one embodiment, the DCI is one of one or more certain DCI formats for which PDCCH or DCI repetition is allowed to occur.

In one embodiment, a radio network temporary identifier (RNTI) associated to the DCI is one of one or more certain RNTIs for which PDCCH or DCI repetition is allowed to occur.

Corresponding embodiments of a wireless communication device are also provided. In one embodiment, a wireless communication device for reception of PDCCH repetitions over multiple CORESETs in a cellular communications system is adapted to receive a configuration of a first CORESET and a second CORESET. The wireless communication device is further adapted to receive, from one or more network nodes, a first repetition of a PDCCH carrying DCI in the first CORESET and a second repetition of the PDCCH carrying the same DCI in the second CORESET, wherein the first and second repetitions of the PDCCH have either: (a) different channel encoding or (b) a same channel encoding. The wireless communication device is further adapted to decode the DCI based on the first repetition of the PDCCH and/or the second repetition of the PDCCH.

In one embodiment, a wireless communication device for reception of PDCCH repetitions over multiple CORESETs in a cellular communications system comprises one or more transmitters, one or more receivers, and processing circuitry associated with the one or more transmitters and the one or more receivers. The processing circuitry is configured to cause the wireless communication device to receive a configuration of a first CORESET and a second CORESET. The processing circuitry is further configured to cause the wireless communication device to receive, from one or more network nodes, a first repetition of a PDCCH carrying DCI in the first CORESET and a second repetition of the PDCCH carrying the same DCI in the second CORESET, wherein the first and second repetitions of the PDCCH have either: (a) different channel encoding or (b) a same channel encoding. The processing circuitry is further configured to cause the wireless communication device to decode the DCI based on the first repetition of the PDCCH and/or the second repetition of the PDCCH.

Embodiments of a method performed by a network node are also disclosed. In one embodiment, a method performed by a network node for transmission of at least one of two or more PDCCH repetitions over multiple CORESETs in a cellular communications system comprises transmitting, to a wireless communication device, a configuration of a first CORESET and a second CORESET. The method further comprises transmitting, to the wireless communication device, at least one of a first repetition of a PDCCH carrying DCI in the first CORESET and a second repetition of the PDCCH carrying the same DCI in the second CORESET, wherein the first and second repetitions of the PDCCH have either: (a) different channel encoding or (b) a same channel encoding.

In one embodiment, transmitting the at least one of the first repetition of the PDCCH in the first CORESET and the second repetition of the PDCCH in the second CORESET comprises transmitting the first repetition of the PDCCH in the first CORESET, wherein the second repetition of the PDCCH is transmitted in the second CORESET by a separate network node.

In one embodiment, transmitting the at least one of the first repetition of the PDCCH in the first CORESET and the second repetition of the PDCCH in the second CORESET comprises transmitting the first repetition of the PDCCH in the first CORESET on a first beam, wherein the second repetition of the PDCCH in the second CORESET is transmitted on a second beam.

In one embodiment, the first CORESET is associated with a first transmission configuration indicator (TCI) state and the second CORESET is associated with a second TCI state, wherein the first TCI state is either the same as or different from the second TCI state. In one embodiment, the first and the second network nodes or the first or second beams are associated with the first and the second TCI states, respectively.

In one embodiment, the first and the second repetitions of the PDCCH are transmitted in first control channel elements, CCEs, of the first CORESET and second CCEs of the second CORESET, respectively. In one embodiment, the first and the second CCEs have a one-to-one mapping. In one embodiment, the first and the second CCEs have the same CCE indices. In one embodiment, the first and the second CCEs have different CCE indices.

In one embodiment, each of the first and the second CORESETs comprises a number of OFDM symbols in time domain and a number of resource blocks in frequency domain.

In one embodiment, the first and the second CORESETs are multiplexed either in time, frequency, or a combination of both time and frequency.

In one embodiment, either a PDSCH or a PUSCH is scheduled by the DCI. In one embodiment, the method further comprises determining a time offset between the DCI and the scheduled PDSCH or PUSCH. In one embodiment, the time offset is between: (a) a last symbol in time from among all symbols of the first repetition of the PDCCH and the second repetition of the PDCCH and (b) a first symbol of the scheduled PDSCH or PUSCH. In one embodiment, the method further comprises determining a reference symbol from among the first and the second repetitions of the PDCCH for the scheduled PDSCH or PUSCH. In one embodiment, the reference symbol is a first symbol in time of one of the first repetition of the PDCCH and the second repetition of the PDCCH that starts at a same time or later in time. In one embodiment, the reference symbol is a first symbol in time of one of the first repetition of the PDCCH and the second repetition of the PDCCH in one of the first and the second CORESETs having a lowest CORESET index.

In one embodiment, either a CSI-RS or a SRS is triggered by the DCI. In one embodiment, the method further comprises determining a time offset between reception of the DCI and the triggered CSI-RS or SRS. In one embodiment, the time offset is between: (a) a last symbol in time from among all symbols of the first repetition of the PDCCH and the second repetition of the PDCCH and (b) the corresponding one of the CSI-RS or SRS.

In one embodiment, a PDSCH is scheduled by the DCI, and the method further comprises determining a PUCCH resource in a PUCCH resource set for carrying a HARQ ACK or NACK associated with the scheduled PDSCH, wherein the PUCCH resource set has more than eight PUCCH resources. In one embodiment, determining the PUCCH resource comprises determining an index of a first CCE over which the first repetition of the PDCCH or second repetition of the PDCCH is transmitted and a total number of CCEs in the first CORESET or the second CORESET over which the first repetition of the PDCCH or second repetition of the PDCCH is transmitted.

In one embodiment, the first and the second PDCCHs are identical. In another embodiment, the first PDCCH is different from the second PDCCH.

In one embodiment, the DCI is one of one or more certain DCI formats for which PDCCH or DCI repetition is allowed to occur.

In one embodiment, a RNTI associated to the DCI is one of one or more certain RNTIs for which PDCCH or DCI repetition is allowed to occur.

Corresponding embodiments of a network node are also disclosed. In one embodiment, a network node for transmission of at least one of two or more PDCCH repetitions over multiple CORESETs in a cellular communications system is adapted to transmit, to a wireless communication device, a configuration of a first CORESET and a second CORESET. The network node is further adapted to transmit, to the wireless communication device, at least one of a first repetition of a PDCCH carrying a DCI in the first CORESET and a second repetition of the PDCCH carrying the same DCI in the second CORESET, wherein the first and second repetitions of the PDCCH have either: (a) different channel encoding or (b) a same channel encoding.

In one embodiment, a network node for transmission of at least one of two or more PDCCH repetitions over multiple CORESETs in a cellular communications system comprises processing circuitry configured to cause the network node to transmit, to a wireless communication device, a configuration of a first CORESET and a second CORESET. The processing circuitry is further configured to cause the network node to transmit, to the wireless communication device, at least one of a first repetition of a PDCCH carrying a DCI in the first CORESET and a second repetition of the PDCCH carrying the same DCI in the second CORESET, wherein the first and second repetitions of the PDCCH have either: (a) different channel encoding or (b) a same channel encoding.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 15 through 18 are flow charts that illustrate example embodiments of methods implemented in a communication system such as that of FIG. 13.

DETAILED DESCRIPTION

Figure 1:
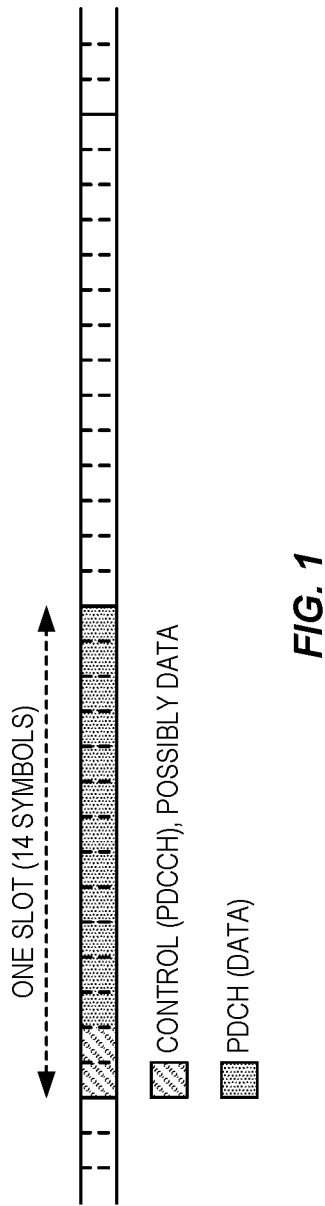
FIG. 1 illustrates an example of a slot in Third Generation Partnership Project (3GPP) New Radio (NR)
Figure 2:
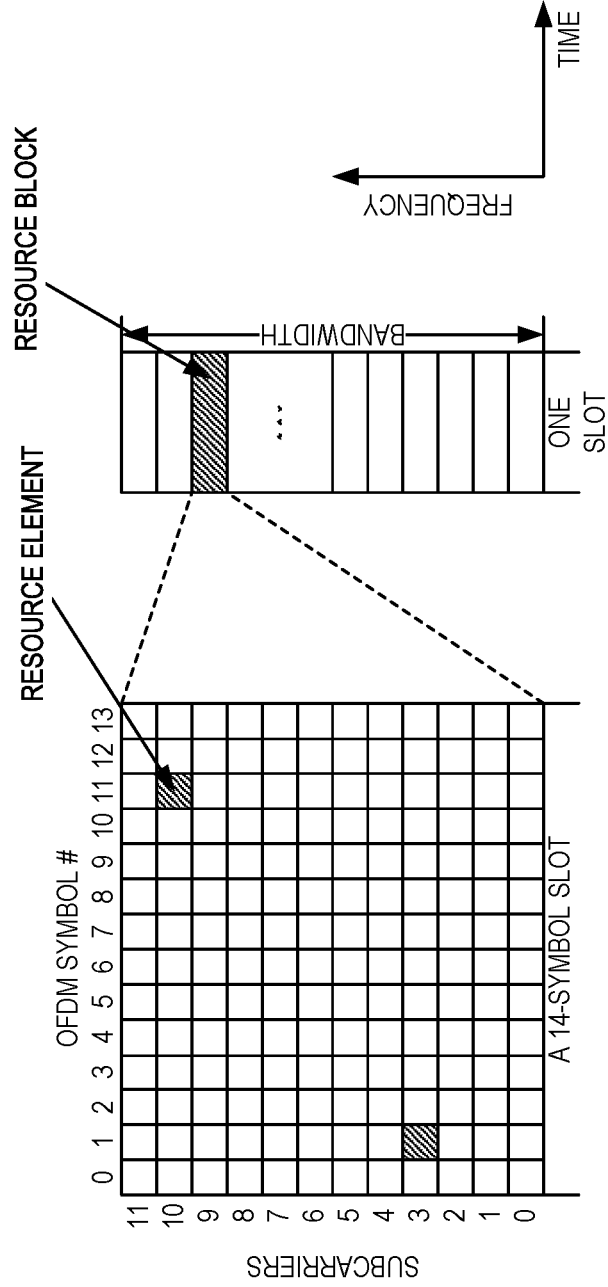
FIG. 2 illustrates the basic NR physical time-frequency resource grid.
Figure 3:
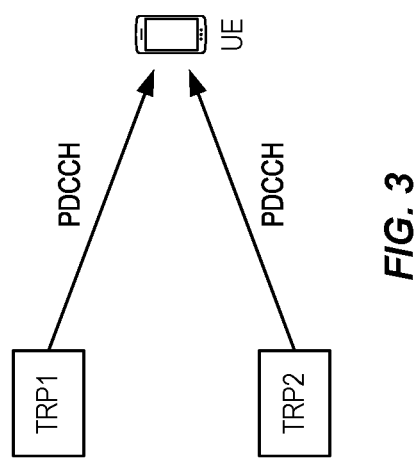
FIG. 3 illustrates an example of Physical Downlink Control Channel (PDCCH) transmission from multiple Transmission/Reception Points (TRPs)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node. Another example of a radio access node is a Transmission Reception Point (TRP).

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). For Physical Downlink Control Channel (PDCCH) repetition with soft combining, one issue is how a UE knows which two PDCCH candidates in two Control Resource Sets (CORESETs) carry the same Downlink Control Information (DCI) and thus can be soft combined. For PDCCH repetition with or without soft combining, since the two PDCCH transmission occasions can be in different symbols in a slot, another issue is how to define the time offset between the reception of the downlink (DL) DCI and the corresponding Physical Downlink Shared Channel (PDSCH) in case of PDCCH repetition, which is defined currently in NR Release 15 and Release 16 as the number of symbols between the last PDCCH symbol and its scheduled PDSCH. The issue occurs in this case since there may now be more than one PDCCH occasion transmitted and received with the same DCI. The offset is used to compare to a threshold and, depending on whether the offset exceeds the threshold, different assumptions are made on the Transmission Configuration Indictor (TCI) state(s) to assume for the PDSCH reception. A similar ambiguity exists in time offset between a PDCCH reception and its scheduled Physical Uplink Shared Channel (PUSCH), a triggered aperiodic Non-Zero Power (NZP) Channel State Information Reference Signal (CSI-RS), or a triggered Sounding Reference Signal (SRS) transmission.

When a DL PDSCH is scheduled by a DCI carried by a PDCCH and a PUCCH resource set with more than eight (8) PUCCH resources is selected for Hybrid Automatic Repeat Request (HARQ) ACK/NACK (A/N) report for the PDSCH, PUCCH Resource Indicator (PRI) in the DCI is used together with the index of a first Control Channel Element (CCE) for the PDCCH reception for identifying a PUCCH resource for sending the HARQ A/N. In case of PDCCH repetition without combining, the first CCE for each of multiple PDCCH transmission occasions would be different. Depending on which PDCCH occasion is decoded successfully, different PUCCH resources could be selected by a UE and, since gNB then does not know in which of the PDCCH occasions the PDCCH was decoded successfully (or in case of soft combining of multiple PDCCHs, how to define the PDCCH to assume for this purpose), the gNB would need to blind decode in two or more PUCCH resources. If all PDCCH occasions were decoded successfully, which PUCCH resource to use would be an issue.

Certain aspects of the present disclosure and their embodiments may provide solutions to the aforementioned or other challenges. Embodiments are disclosed herein for PDCCH repetition over multiple CORESETs in a wireless network. More specifically, embodiments of a method performed by a radio access node for PDCCH repetition over multiple CORESETs and corresponding embodiments of a radio access node are disclosed herein. In some embodiments, a method performed by a radio access node for PDCCH repetition over multiple CORESETs comprises configuring a UE with a search space set with more than one associated CORESET (e.g., a first CORESET and a second CORESET). In some embodiments, the first symbol of each CORESET in the search space set may be individually configured or a gap between the CORESETs is configured. The method further comprises transmitting a PDCCH transmission (e.g., a DCI or "DCI message") in at least two of the CORESETs in the search space set. In some embodiments, if PDCCH repetition is configured or enabled, the PDCCH is repeated in the at least two CORESETs in the search space set on CCEs with the same indices. In some embodiments, the UE always tries to decode the PDCCH in the CCEs in the two or more CORESETs, either with or without soft combining. In some embodiments, the time offset between a PDCCH and its scheduled PDSCH or PUSCH is defined between the last symbol of the multiple PDCCH transmission occasions regardless of in which CORESET the PDCCH is successfully decoded.

Embodiments of a method performed by a UE for reception of two or more PDCCH repetitions (e.g., two or more DCI repetitions or "DCI message" repetitions) over multiple CORESETs and corresponding embodiments of a UE are also disclosed herein. In some embodiments, a method performed by a UE for reception of two or more PDCCH repetitions over multiple CORESETs comprises receiving (e.g., from a radio access node) one or more configurations that configure the UE with a search space set that includes more than one associated CORESET (e.g., a first CORESET and a second CORESET). In some embodiments, the first symbol of each CORESET in the search space set may be individually configured or a gap between the CORESETs is configured. The method further comprises receiving a PDCCH transmission (e.g., a DCI or "DCI message") in at least two of the CORESETs in the search space set. In other words, the UE receives two or more repetitions of the PDCCH transmission (e.g., two or more repetitions of a DCI or "DCI message) in two or more respective CORESETs in the search space set. In some embodiments, if PDCCH repetition is configured or enabled, the PDCCH is repeated in the at least two CORESETs in the search space set on CCEs with the same indices. The method further comprises decoding the PDCCH transmission based on the received PDCCH transmissions in the at least two of the CORESETs in the search space set.

Certain embodiments may provide one or more of the following technical advantage(s). Embodiments disclosed herein provide a simple way to link resources of two or more PDCCH repetitions in a search space and ensure a unique PUCCH resource allocation, e.g., in case that there are more than eight (8) resources in a PUCCH resource set. Embodiments disclosed herein may also enable a UE to determine a unique time offset between a detected PDCCH and its scheduled PDSCH or PUSCH in case of PDCCH repetition regardless of where the PDCCH is successfully decoded.

Figure 4:
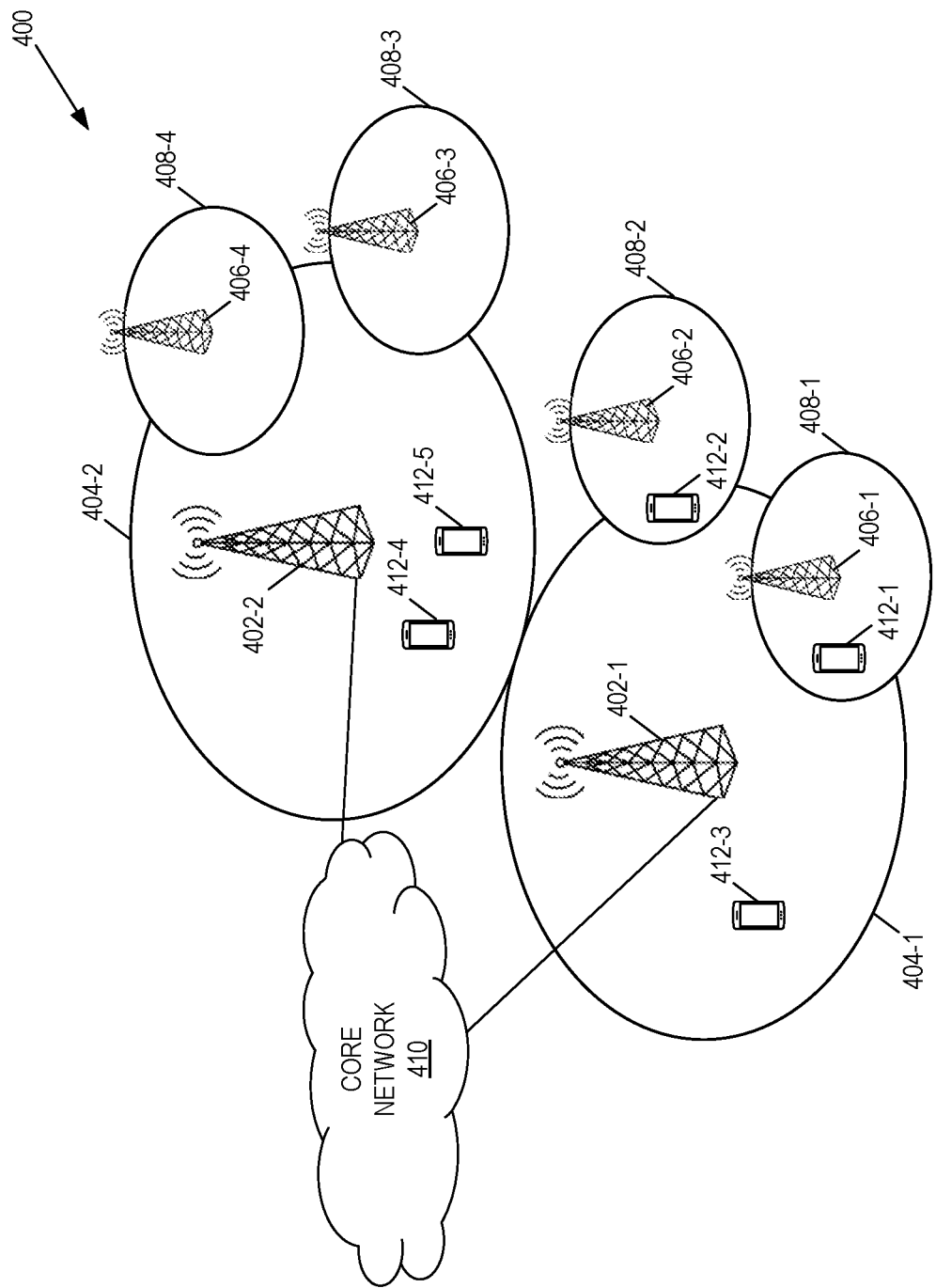
FIG. 4 illustrates one example of a cellular communications system 400 in which embodiments of the present disclosure may be implemented.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) or an Evolved Packet System (EPS) including an Evolved Universal Terrestrial Radio Access Network (E-UTRAN). In this example, the RAN includes base stations 402-1 and 402-2, which in an NG-RAN are referred to as gNBs (NR base stations) or ng-eNBs (i.e., eNBs connected to 5GC) and in E-UTRAN (i.e., LTE) are referred to as eNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G core (5GC). The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs and as such sometimes referred to herein as UEs 412, but the present disclosure is not limited thereto.

Embodiments are disclosed herein for PDCCH repetition over multiple CORESETs in a wireless network such as, e.g., the cellular communications system 400 of FIG. 4. Embodiments are described below for 3GPP systems and, as such, 3GPP terminology is used. However, the embodiments are not limited thereto.

In general, embodiments disclosed herein relate to linking PDCCH resources for multiple PDCCH transmission occasions.

In one embodiment, a search space set is defined to be associated with two or more CORESETs. Each CORESET is configured to be associated with an individual TCI state which allows them to be transmitted from different TRPs or different beams from the same TRP. The UE 412 may use the RS in the associated TCI state for time and/or frequency synchronization.

A PDCCH or a DCI (also referred to herein as a "DCI message") is repeated in the CORESETs within a slot. Repeating a DCI means that the information content is the same while the channel encoding may be the same or different for each PDCCH transmitting this DCI. Thereby if different encodings are used, some coding diversity may be achieved. Repeating PDCCH means that the information content is the same and same encoding is used for each PDCCH (gain in signal to noise ratio can be achieved).

In both cases, when a PDCCH or a DCI is repeated in two or more CORESETs within a slot, the information content is the same. In one embodiment, in order to ensure the same payload size for the DCI repeated in the two or more CORESETs with DCI format 1_1, the 'tci-PresentInDCI' field should be either present/enabled in all of the two or more CORESETs within a slot or be absent/disabled in all of the two or more CORESETs within a slot. Similarly, in order to ensure the same payload size for the DCI repeated in the two or more CORESETs with DCI format 1_2, the 'tci-PresentInDCI-ForDCIFormat1_2' field should be either present/enabled in all of the two or more CORESETs within a slot or be absent/disabled in all of the two or more CORESETs within a slot.

The decoding of the PDCCH can be with or without soft combining. Whether the UE 412 uses soft combining of PDCCH can be indicated from the UE 412 to the network by higher layer signaling, e.g. as a UE capability or feature.

In one embodiment, the PDCCH may be repeated in CCEs with the same CCE indices in different CORESETs. With such configuration, a UE 412 is indicated from the network that PDCCH repetition may occur in the search space set, the UE 412 knows exactly what resources (i.e., CCEs) of a PDCCH that may be repeated, and the UE 412 knows this from either signaling by higher layers or from specification. Since the same CCE indices in different CORESETs are linked in this manner, the index for a first CCE in all PDCCH repetition occasions is the same and, consequently, they all point to the same PUCCH resource for HARQ A/N transmission associated with the PDSCH scheduling.

In another embodiment, the CCEs between any two CORESETs are linked in a one-to-one mapping. The CCE #i in a first CORESET is linked to CCE #k in a second CORESET where i is not equal to k, in general. The CORESET identifier p may be the same for these two CORESETs in the CORESET set and, hence, the CCEs are mapped identically to physical resources for these two CORESETs. A mapping rule, or hashing table, is specified or signaled to the UE 412, where the mapping rule links the CCEs between any two CORESETs, i.e. translates i to k. The benefit of deviating from the i=k mapping is that frequency diversity is achieved in the PDCCH transmissions from different CORESETs, especially if the two CORESETs are linked to the same TCI state and are thus transmitted from the same transmission point. In this case, it is beneficial if the two PDCCH transmitted from different CORESETs use different CCEs as they are mapped to different time and/or frequency resources. One example method to define the hashing function is to determine k=(i+L/2)mod L where L is the number of CCEs in the CORESET. In this case, the first CCE of the first CORESET is linked to the "middle numbered" CCE of the second CORESET and so on. In this case, regardless in which CORESET(s) a PDCCH is successfully decoded, the first CCE and the number of CCEs in one of the CORESETs are always used in deriving the corresponding PUCCH resource if a PDSCH is scheduled.

In one embodiment, the number of CCEs is configured by the network to be the same for all the CORESETs associated to the search space set. In another embodiment, the number of CCEs of the CORESETs may be configured to be different. In this case, the number of CCEs of one of the CORESETs may be used in deriving a PUCCH resource when an associated PUCCH resource set has more than 8 PUCCH resources and a PDSCH is scheduled by the DCI. In one embodiment, the CORESET with the smallest (or the largest) number of CCEs may be the selected CORESET for the purpose of PUCCH resource determination. In another embodiment, the number of CCEs of a CORESET over which a PDCCH is correctly detected is used. In yet another embodiment, the first CCE and the number of CCEs to be used are associated with either the first or the second CORESET.

In the search space set configuration, a first symbol for each of the associated CORESETs within a slot is signaled by the network to the UE, e.g. using higher layer signaling such as RRC. The CORESETs may be either time division multiplexed (TDMed) or frequency division multiplexed (FDMed) in a slot.

When a DL DCI is carried by the PDCCH, the time offset between the reception of the DL DCI and the corresponding PDSCH is defined as the number of symbols between the last symbol of the multiple PDCCH transmit occasions and the first symbol of the PDSCH. If the DL DCI schedules multiple PDSCH transmission occasions, then the time offset is defined as the number of symbols between the last symbol of the multiple PDCCH transmit occasions and the first symbol of the first PDSCH transmission occasion. The PDSCH can be within the same slot as the PDCCHs or in a different slot.

When a UL DCI is carried by the PDCCH, the time offset between the reception of the UL DCI and the corresponding PUSCH is defined as the number of symbols between the last symbol of the multiple PDCCH transmit occasions and the first symbol of the PUSCH. If the UL DCI schedules multiple PUSCH transmission occasions, then the time offset is defined as the number of symbols between the last symbol of the multiple PDCCH transmit occasions and the first symbol of the first PUSCH transmission occasion.

Similarly, when an aperiodic channel state information reference signal (CSI-RS) or an aperiodic sounding reference signal (SRS) is triggered by a DCI carried by the PDCCH, the time offset between the reception of the DCI and the corresponding CSI-RS or SRS is defined as the number of symbols between the last symbol of the multiple PDCCH transmit occasions and the first symbol of the CSI-RS or SRS.

When the use of reference $S_0$ is enabled via higher layer signaling, the starting symbol for a PDSCH scheduled by DCI format 1_2 with $K_0=0$ (i.e., slot offset 0) is defined with respect to $S_0$ where $S_0$ is the starting symbol of the PDCCH monitoring occasion in which the DL assignment is detected. If the PDSCH is scheduled with DCI format 1_2 via multiple PDCCH transmission occasions, then the reference $S_0$ is defined as starting symbol of the latest PDCCH transmission occasion among the multiple PDCCH transmission occasions. In an alternative embodiment, the reference $S_0$ is defined as starting symbol of the PDCCH transmission occasion corresponding to the lowest CORESET ID.

Figure 5:
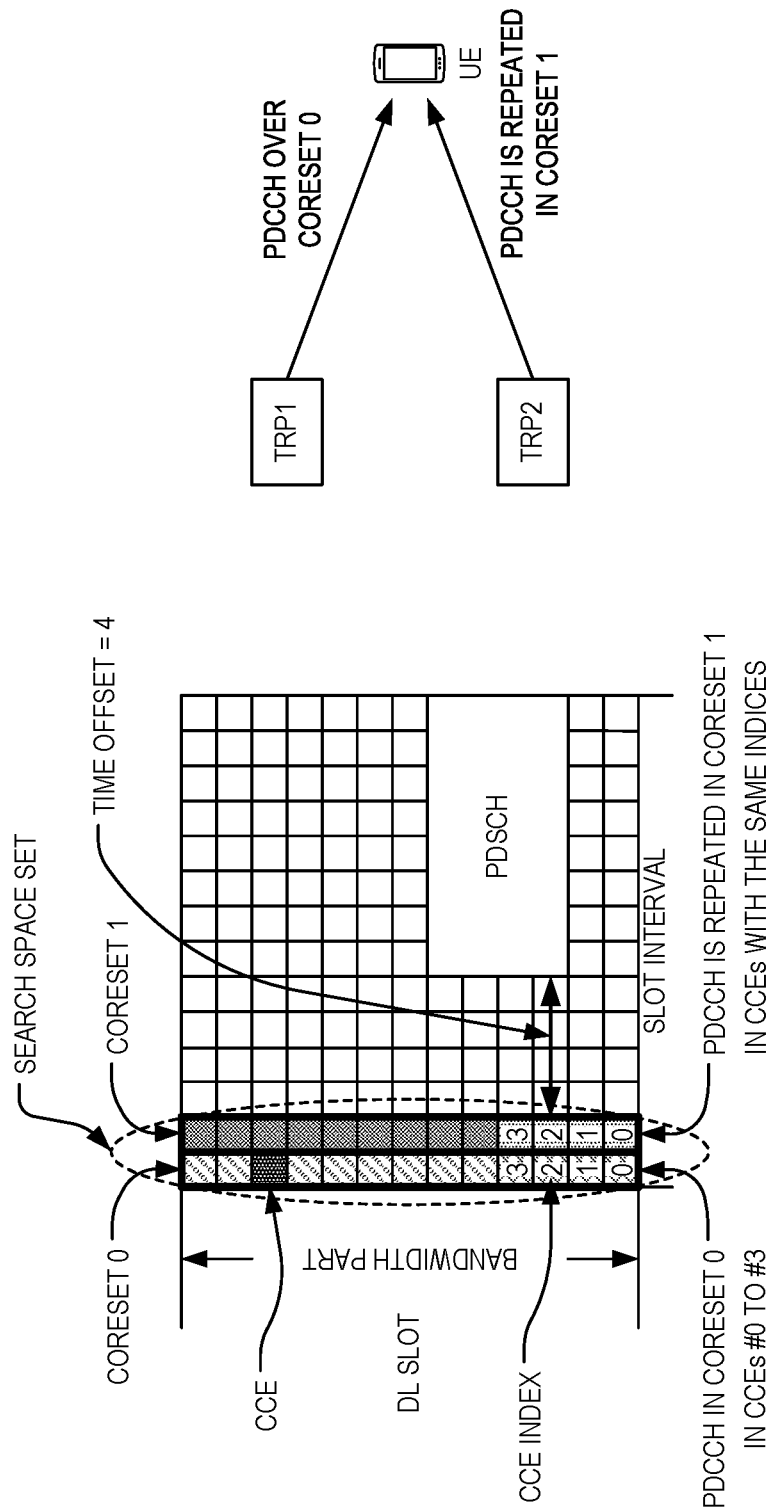
FIGS. 5 and 6 illustrate examples in accordance with embodiments of the present disclosure.

An example is shown in FIG. 5, where a search space is associated with two CORESETs. In this example, the two CORESETs are TDMed and each CORESET consists of one symbol. The first symbol of CORESET 0 starts at symbol 0 and the first symbol of CORESET 1 starts at symbol 1. A PDCCH with aggregation level 4 is repeated in the two CORESETs in CCEs #0 to 3 in both CORESETs. The time offset between the reception of the DL DCI and the corresponding PDSCH is 4 in this example, regardless of whether soft combining is used or not and in which CORESET the DCI is actually decoded. The two CORESETs may be associated with two TRPs by activating two TCI states each associated to one TRP, and in that case, the PDCCH would be repeated over the two TRP as shown in FIG. 5.

Figure 6:
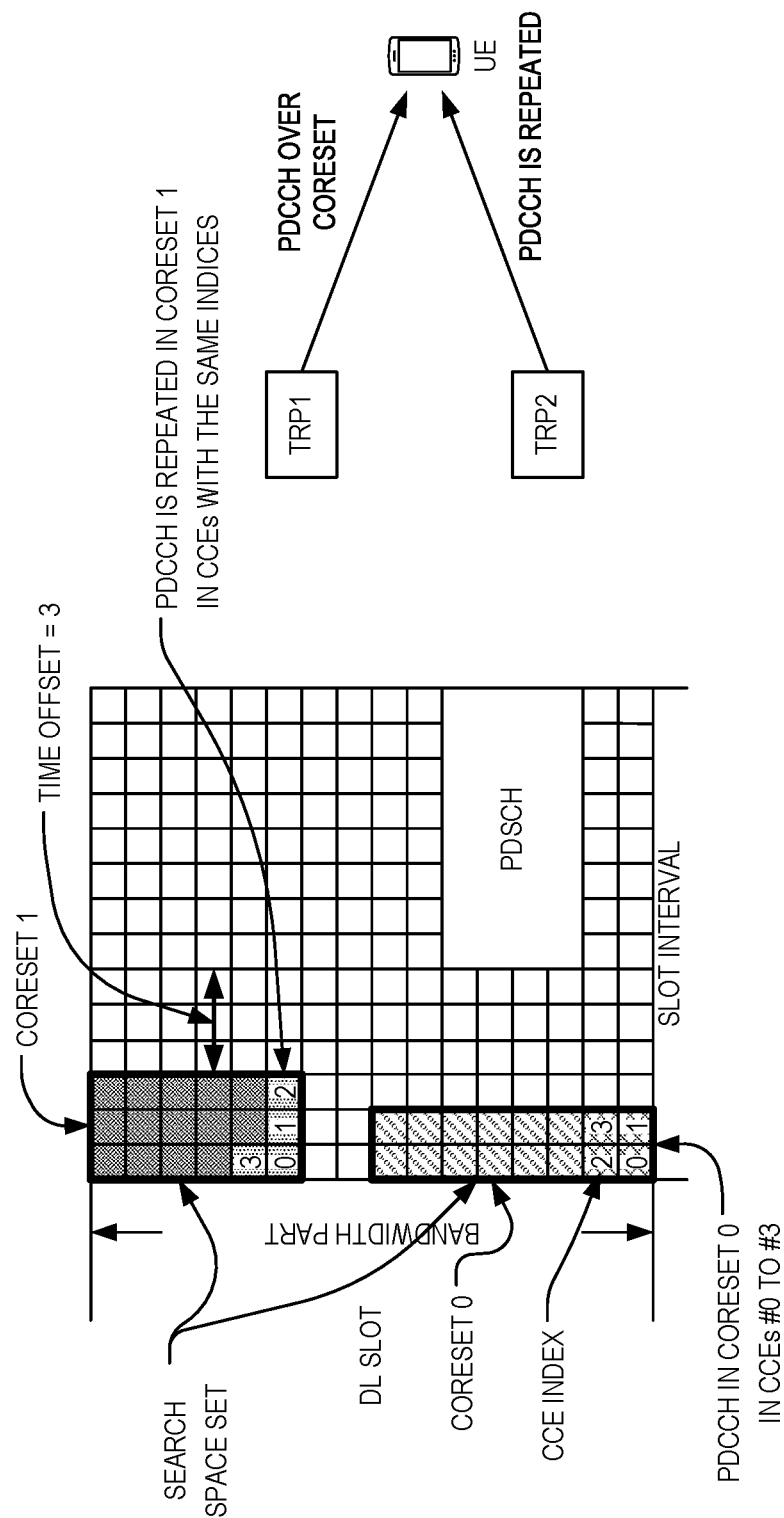

FIG. 6 shows an example of PDCCH repetition in a search space set associated with two CORESETs in an FDM manner. This could be used at lower carrier frequency (e.g., frequency range 1, FR1) where a UE 412 can receive from multiple TRPs simultaneously or the two CORESETs are associated with a single TRP but two different panels.

In one embodiment, applying the PDCCH repetition methods is dependent on the search spaces, CORESETs, the RNTIs, or DCI formats.

E.g., it may only be applied to UE specific search spaces,
E.g., it may only be applied to certain group of CORESETs,
E.g., it may only be applied to PDCCH scrambled with CS-RNTI, C-RNTI, or MCS-C-RNTI, or
E.g., it may only be applied to DCI format 1_1, DCI 1_2, DCI 0_1, or DCI 0_2.
E.g., it may only be applied when the high priority indicator in DCI format 0_2 or DCI format 1_2 is set.

In one embodiment, the PDCCH repetition can be used to activate one uplink configured grant transmission or one downlink SPS reception.

In one embodiment, the PDCCH repetition can be used to deactivate uplink configured grant transmission or downlink SPS reception.

Figure 7:
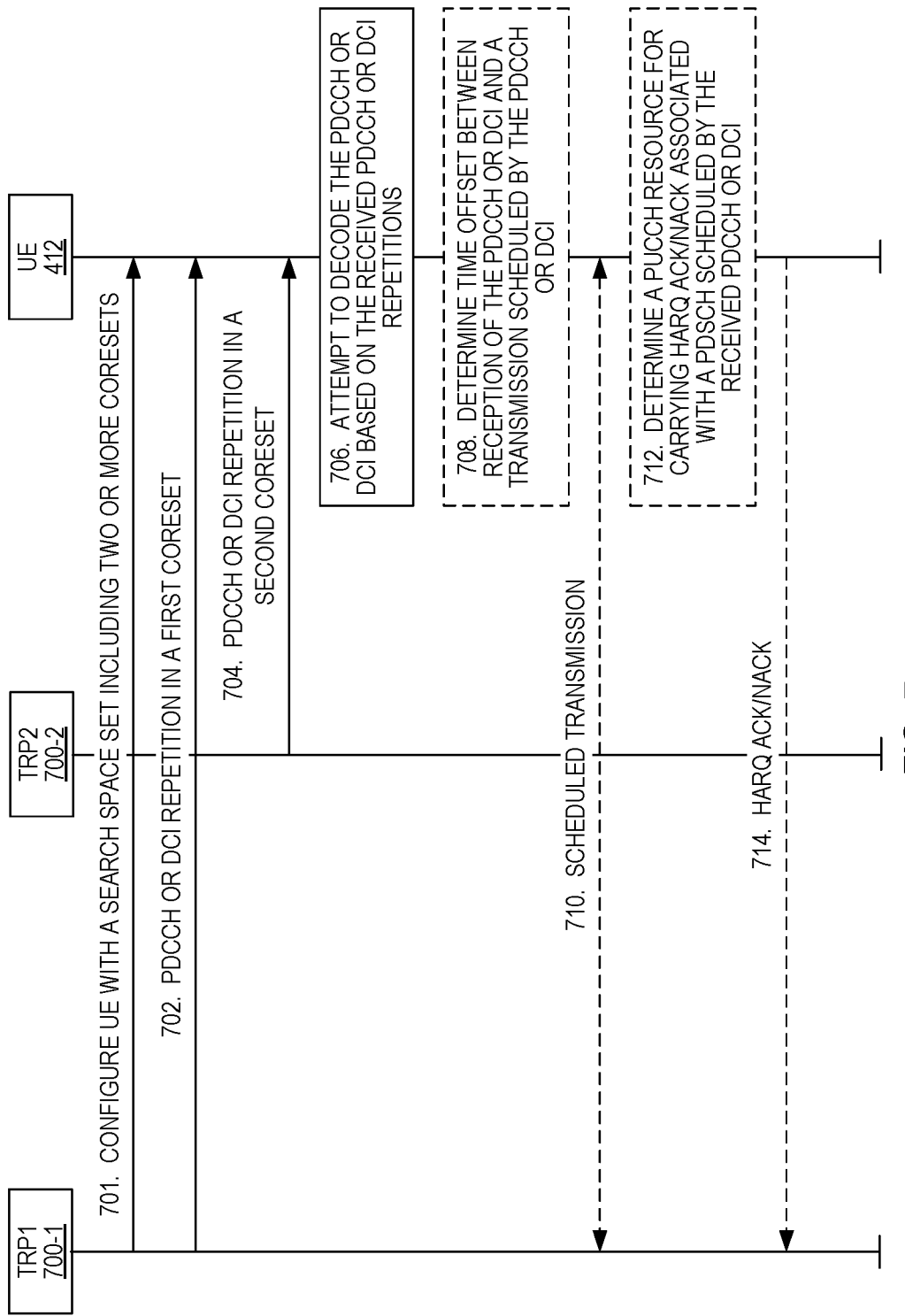
FIG. 7 illustrates the operation of two TRPs and a User Equipment (UE) in accordance embodiments of the present disclosure.

FIG. 7 illustrates the operation of two TRPs (TRP1 700-1 and TRP2 700-2) and a UE 412 in accordance with at least some aspects of the embodiments described above. Note that optional steps are represented by dashed lines/boxes. Further, any one or more of these steps may be performed in this method (i.e., not all steps are required). TRP1 700-1 and TRP2 700-2 may correspond to, for example, different base stations (e.g., base station 402-1 and base station 402-2 or base station 402-1 and low power node 406-1) and the UE 412 may be, e.g., the wireless communication device 412-1. As another example, TRP1 700-1 and TRP2 700-2 may correspond to different beams from the same base station (e.g., base station 402-1).

As illustrated, the UE 412 is configured with a search space set that includes two or more CORESETs, as described above (step 701). In this example, the configuration is received from TRP1 700-1, but is not limited thereto. As described above, TRP1 700-1 transmits a first PDCCH or DCI repetition in a first CORESET (step 702), and TRP2 700-2 transmits a second PDCCH or DCI repetition in a second CORSET (step 704). The first and second CORESETs are different ones of the two or more CORESETs included in the configured search space set. The details described above regarding the search space set, the PDCCH or DCI repetitions, the CORESETs, and the transmission of the PDCCH or DCI repetitions are equally applicable here.

At the UE 412, the UE 412 receives the PDCCH or DCI repetitions in the first and second CORESETs and attempts to decode the PDCCH or DCI based on the received repetitions, as described above (step 706).

In some embodiments, the PDCCH or DCI is successfully decoded and schedules an associated PDSCH or PUSCH transmission for the UE 412. In this case, the UE 412 may determine a time offset (e.g., expressed as a number of symbols) between the received PDCCH or DCI and the scheduled PDSCH or PUSCH transmission as described above (step 708). The UE 412 then receives/transmits the PDSCH/PUSCH in accordance with the determined time offset, as described above (step 710). Note that the details described above regarding determining the time offset and receiving/transmitting the scheduled PDSCH/PUSCH are equally applicable here.

In some embodiments, the PDCCH or DCI is successfully decoded and schedules an associated PDSCH transmission for the UE 412. In this case, the UE 412 may determine a PUCCH resource for carrying a HARQ ACK/NACK associated with the scheduled PDSCH transmission as described above (step 712) and transmits a HARQ ACK/NACK for the scheduled PDSCH transmission using the determined PUCCH resource (step 714). In some embodiments, the PDCCH repetitions are repeated in the first and second CORESETs in CCEs with the same CCE indices. As discussed above, since the same CCE indices the first and second CORESETs are linked in this manner, they all point to the same PUCCH resource for HARQ ACK/NACK transmission associated with the PDSCH transmission scheduled by the PDCCH/DCI. In some other embodiments, the CCEs between the first and second CORESETs are linked in a one-to-one mapping (e.g., defined by a predefined or preconfigured mapping table or a predefined or preconfigured hashing function), and the first CCE and the number of CCEs in one of the first and second CORESETs is used to derive the corresponding PUCCH resource for carrying the HARQ ACK/NACK for the scheduled PDSCH transmission. Note that the details described above regarding determining the PUCCH resource for carrying the HARQ ACK/NACK for the scheduled PDSCH are equally applicable here.

Figure 8:
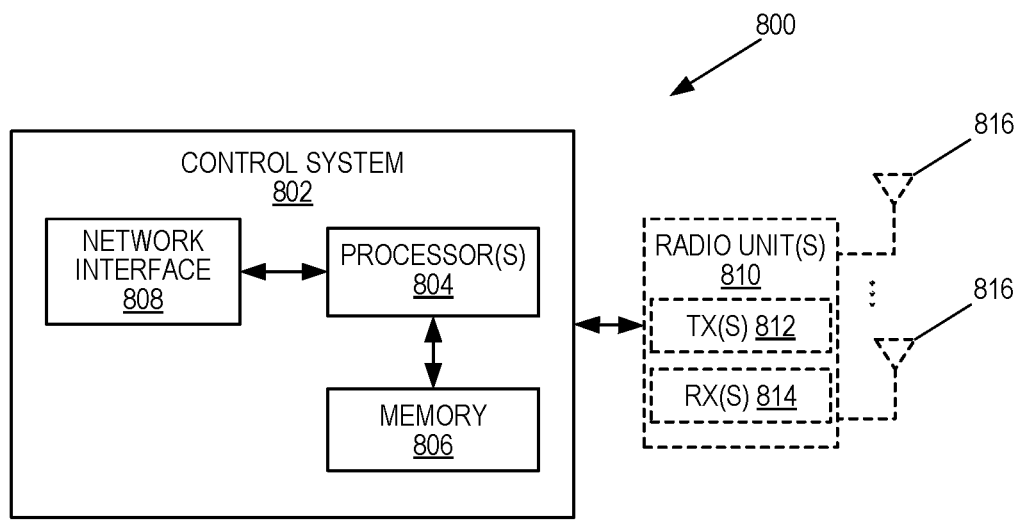
FIGS. 8 through 10 are schematic block diagrams of example embodiments of a radio access node.

FIG. 8 is a schematic block diagram of a radio access node 800 according to some embodiments of the present disclosure. Optional features are represented by dashed boxes. The radio access node 800 may be, for example, a base station 402 or 406 or a network node that implements all or part of the functionality of the base station 402, eNB, gNB, or TRP described herein. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein (e.g., one or more functions of a TRP as described herein, e.g., with respect to FIG. 7). In some embodiments, the function(s) are implemented in software that is stored, e.g., in the memory 806 and executed by the one or more processors 804.

Figure 9:
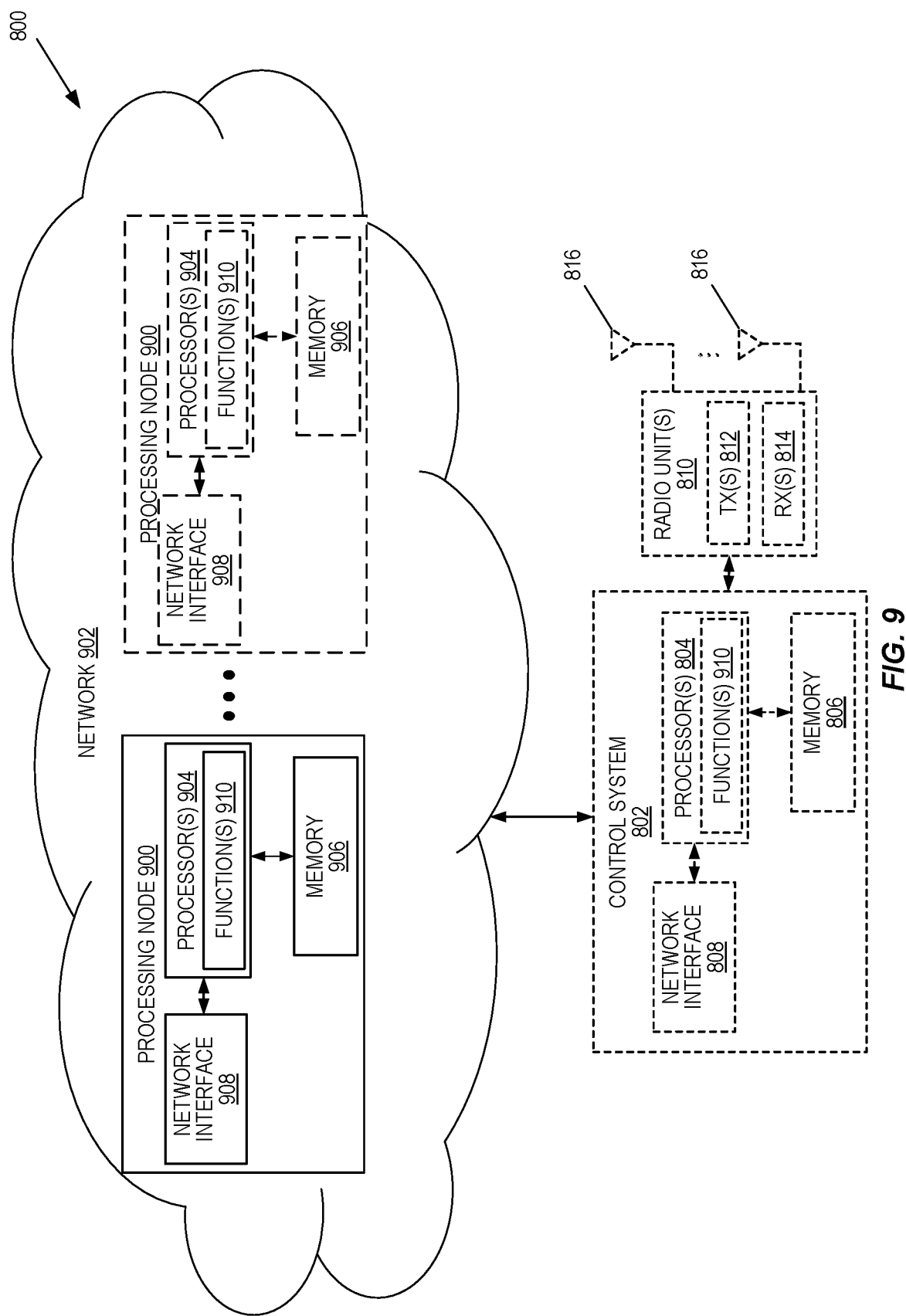

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node (s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902. If present, the control system 802 or the radio unit(s) are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein (e.g., one or more functions of a TRP as described herein, e.g., with respect to FIG. 7) are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein (e.g., one or more functions of a TRP as described herein, e.g., with respect to FIG. 7) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
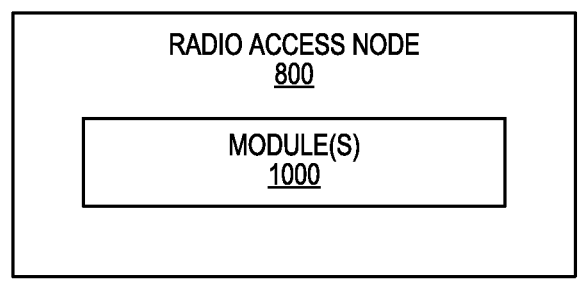

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein (e.g., one or more functions of a TRP as described herein, e.g., with respect to FIG. 7). This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
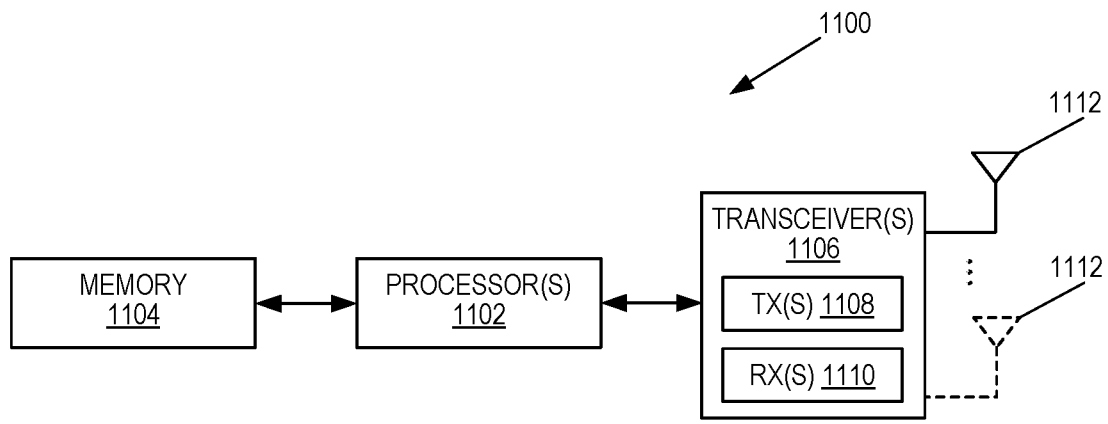
FIGS. 11 and 12 are schematic block diagrams of example embodiments of a UE.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above (e.g., one or more functions of a UE as described herein, e.g., with respect to FIG. 7) may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein (e.g., one or more functions of a UE as described herein, e.g., with respect to FIG. 7) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
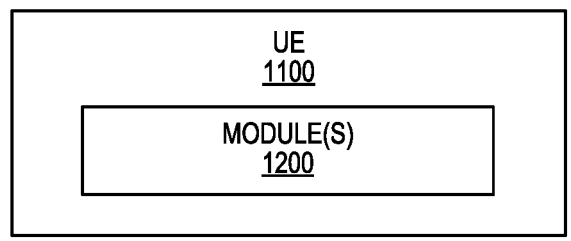

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein (e.g., one or more functions of a UE as described herein, e.g., with respect to FIG. 7).

Figure 13:
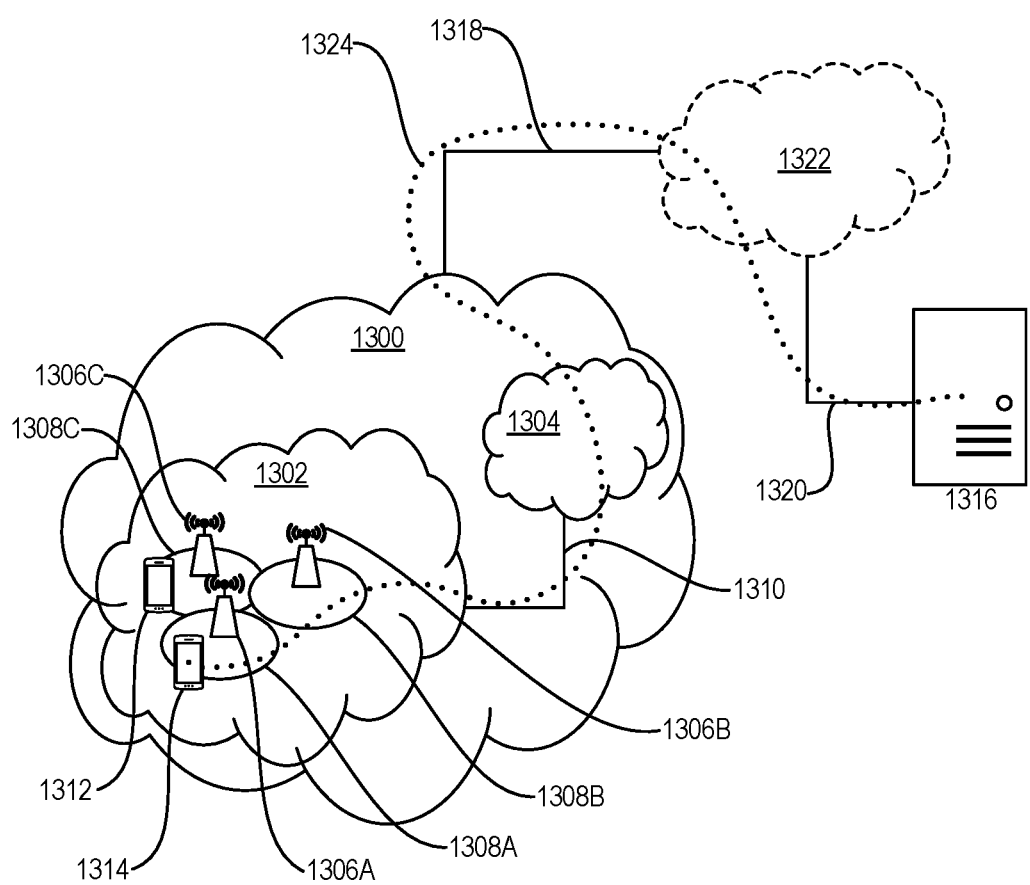
FIG. 13 illustrates an example embodiment of a communication system in which embodiments of the present disclosure may be implemented.

With reference to FIG. 13, in accordance with an embodiment, a communication system includes a telecommunication network 1300, such as a 3GPP-type cellular network, which comprises an access network 1302, such as a RAN, and a core network 1304. The access network 1302 comprises a plurality of base stations 1306A, 1306B, 1306C, such as Node Bs, eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 14:
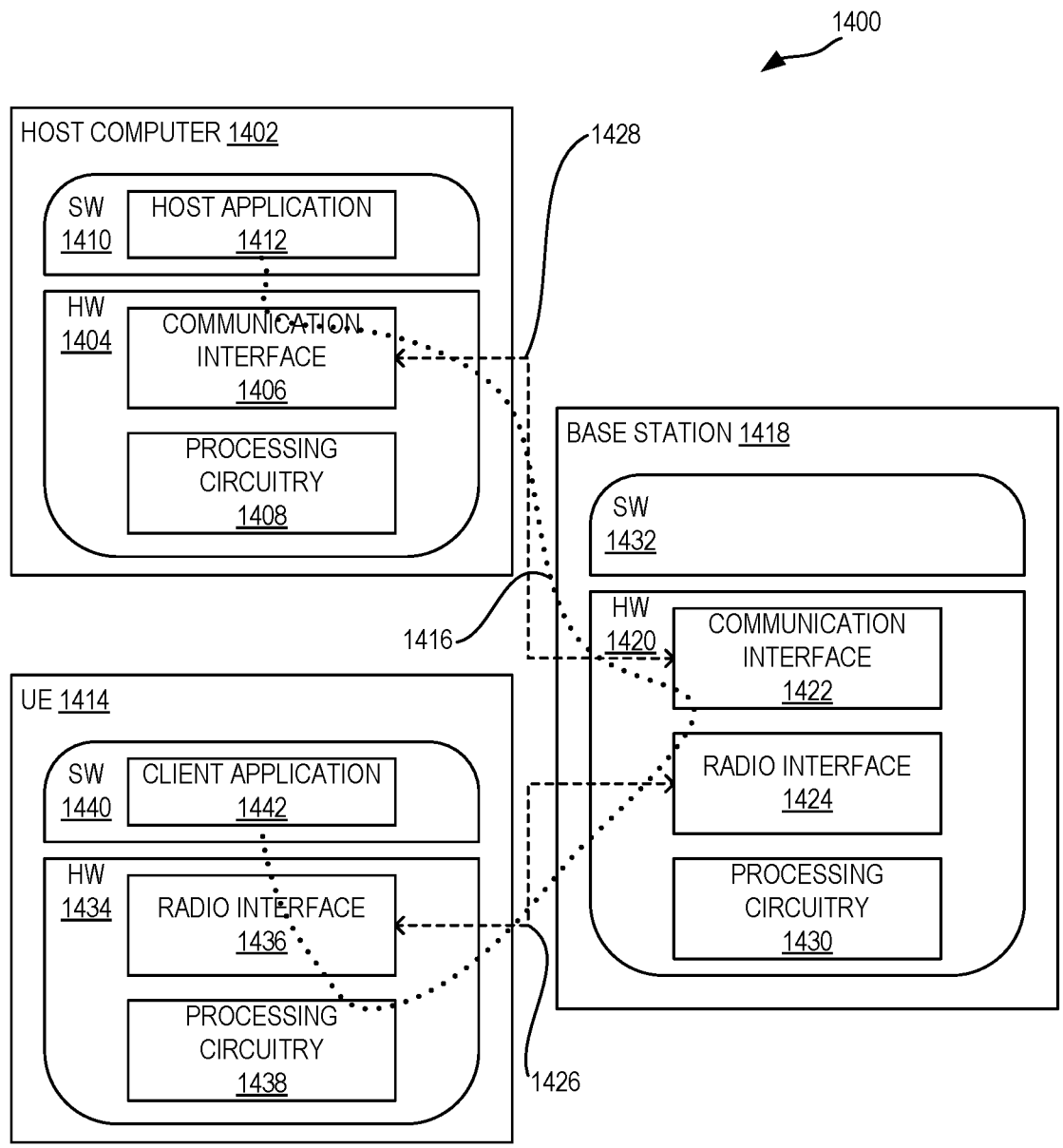
FIG. 14 illustrates example embodiments of the host computer, base station, and UE of FIG. 13.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1700 (which may be optional), the UE receives input data provided by the host computer. Additionally or alternatively, in step 1702, the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method of PDCCH repetition over multiple CORESETs in a wireless network comprising one or more network nodes and a UE, the method comprising one or more of: configuring (701) the UE with a search space set comprising a first CORESET and a second CORESET; transmitting (702; 704), by the one or more network nodes, a DCI in a first PDCCH in the first CORESET and in a second PDCCH in the second CORESET; and decoding (706), by the UE, the DCI based on the first and the second PDCCH.

Embodiment 2: The method of embodiment 1, wherein the first and the second PDCCH are transmitted in CCEs of the first and the second CORESET having the same CCE indices.

Embodiment 3: The method of embodiment 1 or 2, wherein the first and the second CORESETs are multiplexed either in time, frequency, or a combination of both time and frequency.

Embodiment 4: The method of any one of embodiments 1 to 3, wherein the first CORESET is associated with a first TCI state, the second CORESET is associated with a second TCI state, and the first TCI state may be the same or different from the second TCI state.

Embodiment 5: The method of any one of embodiments 1 to 4, wherein the method further comprises scheduling a PDSCH or a PUSCH by the DCI.

Embodiment 6: The method of any one of embodiments 1 to 5, wherein the method further comprises determining (706) a time offset between reception of the DCI and the scheduled one of PDSCH or PUSCH and/or a time offset between reception of the DCI and CSI-RS and/or SRS.

Embodiment 7: The method of embodiment 6, wherein the time offset is between a last symbol of the first and the second PDCCH and the first symbol of the corresponding one of PDSCH, PUSCH, CSI-RS, and SRS.

Embodiment 8: The method of any one of embodiments 1 to 5, wherein a PDSCH is scheduled by the DCI, and the method further comprises determining (712) a PUCCH resource for carrying a HARQ A/N associated with the scheduled PDSCH.

Embodiment 9: The method of embodiment 8, wherein the determining (712) the PUCCH resource comprises determining an index of a first CCE over which the first (or second) PDCCH is transmitted and a total number of CCEs in the first or the second CORESET over which the first (or second) PDCCH is transmitted.

Embodiment 10: The method of any one of embodiments 1 to 9, wherein the first and the second PDCCH are identical.

Embodiment 11: The method of any one of embodiments 1 to 9, wherein the first PDCCH is different from the second PDCCH.

Embodiment 12: The method of any one of embodiments 1 to 11, wherein the PDCCH repetition may occur for certain DCI formats.

Embodiment 13: The method of any one of embodiments 1 to 11, wherein the PDCCH repetition may occur for certain RNTIs.

Embodiment 14: The method of any one of embodiments 1 to 11, wherein the PDCCH repetition may occur for certain UE specific search spaces.

Group A Embodiments

Embodiment 15: A method performed by a wireless communication device (412) for reception of PDCCH repetitions over multiple CORESETs in a cellular communications system (400), the method comprising one or more of: receiving (701) a configuration of a search space set comprising a first CORESET and a second CORESET; receiving (702; 704), from one or more network nodes, a first repetition of a PDCCH/DCI in the first CORESET and a second repetition of the PDCCH/DCI in the second CORESET, the first and second repetitions of the PDCCH/DCI being first and second repetitions of DCI on first and second PDCCHs having either: (a) different channel encoding or (b) a same channel encoding; decoding (706) the PDCCH or DCI based on the first and the second repetitions of the PDCCH or DCI.

Embodiment 16: The method of embodiment 15 wherein receiving (702; 704) the first repetition of the PDCCH/DCI in the first CORESET and the second repetition of the PDCCH/DCI in the second CORESET comprises: receiving (702) the first repetition of the PDCCH/DCI in the first CORESET from a first network node; and receiving (704) the second repetition of the PDCCH/DCI in the second CORESET from a second network node.

Embodiment 17: The method of embodiment 15 wherein receiving (702; 704) the first repetition of the PDCCH/DCI in the first CORESET and the second repetition of the PDCCH/DCI in the second CORESET comprises receiving (702; 704) the first repetition of the PDCCH/DCI in the first CORESET and the second repetition of the PDCCH/DCI in the second CORESET on different beams from a single network node.

Embodiment 18: The method of any one of embodiments 15 to 17, wherein the first and the second PDCCHs are transmitted in CCEs of the first and the second CORESETs having the same CCE indices.

Embodiment 19: The method of any one of embodiments 15 to 18, wherein the first and the second CORESETs are multiplexed either in time, frequency, or a combination of both time and frequency.

Embodiment 20: The methods of any one of embodiments 15 to 19, wherein the first CORESET is associated with a first TCI state, the second CORESET is associated with a second TCI state, and the first TCI state may be the same or different from the second TCI state.

Embodiment 21: The method of any one of embodiments 15 to 20, wherein either a PDSCH or a PUSCH is scheduled by the DCI.

Embodiment 22: The method embodiment 21, further comprising determining (706) a time offset between reception of the DCI and the scheduled PDSCH or PUSCH.

Embodiment 23: The method of any one of embodiments 15 to 22, further comprising determining a time offset between reception of the DCI and CSI-RS and/or SRS.

Embodiment 24: The method of embodiment 22 or 23, wherein the time offset is between a last symbol of the first and the second PDCCH and the first symbol of the corresponding one of PDSCH, PUSCH, CSI-RS, and SRS.

Embodiment 25: The method of any one of embodiments 15 to 24, wherein a PDSCH is scheduled by the DCI, and the method further comprises determining (712) a PUCCH resource for carrying a HARQ A/N associated with the scheduled PDSCH.

Embodiment 26: The method of embodiment 25, wherein determining (712) the PUCCH resource comprises determining an index of a first CCE over which the first (or second) PDCCH is transmitted and a total number of CCEs in the first or the second CORESET over which the first (or second) PDCCH is transmitted.

Embodiment 27: The method of any one of embodiments 15 to 26, wherein the first and the second PDCCHs are identical.

Embodiment 28: The method of any one of embodiments 15 to 26, wherein the first PDCCH is different from the second PDCCH.

Embodiment 29: The method of any one of embodiments 15 to 28, wherein PDCCH/DCI repetition may occur for certain DCI formats.

Embodiment 30: The method of any one of embodiments 15 to 28, wherein PDCCH/DCI repetition may occur for certain RNTIs.

Embodiment 31: The method of any one of embodiments 15 to 28, wherein PDCCH/DCI repetition may occur for certain UE specific search spaces.

Embodiment 32: The method of any of the previous embodiments, further comprising: providing user data; and forwarding the user data to a host computer via the transmission to the base station.

Group B Embodiments

Embodiment 33: A method performed by one or more base stations for transmission of PDCCH repetitions over multiple CORESETs in a cellular communications system (400), the method comprising one or more of: transmitting (701), to a UE, a configuration of a search space set comprising a first CORESET and a second CORESET; transmitting (702; 704), to the UE, a first repetition of a PDCCH/DCI in the first CORESET and a second repetition of the PDCCH/DCI in the second CORESET, the first and second repetitions of the PDCCH/DCI being first and second repetitions of DCI on first and second PDCCHs having either: (a) different channel encoding or (b) a same channel encoding.

Embodiment 34: The method of embodiment 33 wherein transmitting (702; 704) the first repetition of the PDCCH/DCI in the first CORESET and the second repetition of the PDCCH/DCI in the second CORESET comprises: transmitting (702), by a first network node, the first repetition of the PDCCH/DCI in the first CORESET; and transmitting (704), by a second network node, the second repetition of the PDCCH/DCI in the second CORESET.

Embodiment 35: The method of embodiment 33 wherein transmitting (702; 704) the first repetition of the PDCCH/DCI in the first CORESET and the second repetition of the PDCCH/DCI in the second CORESET comprises transmitting (702; 704), by a single network node, the first repetition of the PDCCH/DCI in the first CORESET and the second repetition of the PDCCH/DCI in the second CORESET, on different beams.

Embodiment 36: The method of any one of embodiments 33 to 35, wherein the first and the second PDCCHs are transmitted in CCEs of the first and the second CORESETs having the same CCE indices.

Embodiment 37: The method of any one of embodiments 33 to 36, wherein the first and the second CORESETs are multiplexed either in time, frequency, or a combination of both time and frequency.

Embodiment 38: The methods of any one of embodiments 33 to 37, wherein the first CORESET is associated with a first TCI state, the second CORESET is associated with a second TCI state, and the first TCI state may be the same or different from the second TCI state.

Embodiment 39: The method of any one of embodiments 33 to 38, wherein either a PDSCH or a PUSCH is scheduled by the DCI.

Embodiment 40: The method of any one of embodiments 33 to 39, wherein the first and the second PDCCHs are identical.

Embodiment 41: The method of any one of embodiments 33 to 39, wherein the first PDCCH is different from the second PDCCH.

Embodiment 42: The method of any one of embodiments 33 to 41, wherein PDCCH/DCI repetition may occur for certain DCI formats.

Embodiment 43: The method of any one of embodiments 33 to 41, wherein PDCCH/DCI repetition may occur for certain RNTIs.

Embodiment 44: The method of any one of embodiments 33 to 41, wherein PDCCH/DCI repetition may occur for certain UE specific search spaces.

Embodiment 45: The method of any of the previous embodiments, further comprising: obtaining user data; and forwarding the user data to a host computer or a wireless device.

Group C Embodiments

Embodiment 46: A wireless device for reception of PDCCH repetitions over multiple CORESETs in a cellular communications system, the wireless device comprising: processing circuitry configured to perform any of the steps of any of the Group A embodiments; and power supply circuitry configured to supply power to the wireless device.

Embodiment 47: A base station for PDCCH repetitions over multiple CORESETs in a cellular communications system, the base station comprising: processing circuitry configured to perform any of the steps of any of the Group B embodiments; and power supply circuitry configured to supply power to the base station.

Embodiment 48: A User Equipment, UE, for reception of PDCCH repetitions over multiple CORESETs in a cellular communications system, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 49: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 50: The communication system of the previous embodiment further including the base station.

Embodiment 51: The communication system of the previous 2 embodiments, further including the UE, wherein the UE is configured to communicate with the base station.

Embodiment 52: The communication system of the previous 3 embodiments, wherein: the processing circuitry of the host computer is configured to execute a host application, thereby providing the user data; and the UE comprises processing circuitry configured to execute a client application associated with the host application.

Embodiment 53: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 54: The method of the previous embodiment, further comprising, at the base station, transmitting the user data.

Embodiment 55: The method of the previous 2 embodiments, wherein the user data is provided at the host computer by executing a host application, the method further comprising, at the UE, executing a client application associated with the host application.

Embodiment 56: A User Equipment, UE, configured to communicate with a base station, the UE comprising a radio interface and processing circuitry configured to perform the method of the previous 3 embodiments.

Embodiment 57: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 58: The communication system of the previous embodiment, wherein the cellular network further includes a base station configured to communicate with the UE.

Embodiment 59: The communication system of the previous 2 embodiments, wherein: the processing circuitry of the host computer is configured to execute a host application, thereby providing the user data; and the UE's processing circuitry is configured to execute a client application associated with the host application.

Embodiment 60: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 61: The method of the previous embodiment, further comprising at the UE, receiving the user data from the base station.

Embodiment 62: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 63: The communication system of the previous embodiment, further including the UE.

Embodiment 64: The communication system of the previous 2 embodiments, further including the base station, wherein the base station comprises a radio interface configured to communicate with the UE and a communication interface configured to forward to the host computer the user data carried by a transmission from the UE to the base station.

Embodiment 65: The communication system of the previous 3 embodiments, wherein: the processing circuitry of the host computer is configured to execute a host application; and the UE's processing circuitry is configured to execute a client application associated with the host application, thereby providing the user data.

Embodiment 66: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 67: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 68: The method of the previous embodiment, further comprising, at the UE, providing the user data to the base station.

Embodiment 69: The method of the previous 2 embodiments, further comprising: at the UE, executing a client application, thereby providing the user data to be transmitted; and at the host computer, executing a host application associated with the client application.

Embodiment 70: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 71: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 72: The communication system of the previous embodiment further including the base station.

Embodiment 73: The communication system of the previous 2 embodiments, further including the UE, wherein the UE is configured to communicate with the base station.

Embodiment 74: The communication system of the previous 3 embodiments, wherein: the processing circuitry of the host computer is configured to execute a host application; and the UE is configured to execute a client application associated with the host application, thereby providing the user data to be received by the host computer.

Embodiment 75: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 76: The method of the previous embodiment, further comprising at the base station, receiving the user data from the UE.

Embodiment 77: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).
3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless communication device for reception of physical downlink control channel, PDCCH, repetitions over multiple control resource sets, CORESETs, in a cellular communications system, the method comprising:
receiving a configuration of a first CORESET and a second CORESET;
receiving, from one or more network nodes, a first repetition of a PDCCH carrying downlink control information, DCI, in the first CORESET and a second repetition of the PDCCH carrying the same DCI in the second CORESET, wherein the first and second repetitions of the PDCCH have either: (a) different channel encoding or (b) a same channel encoding, wherein the first and the second repetitions of the PDCCH are transmitted in first control channel elements, CCEs, of the first CORESET and second CCEs of the second CORESET, respectively; and decoding the DCI based on the first repetition of the PDCCH and/or the second repetition of the PDCCH.

2. The method of claim 1 wherein the first and the second CCEs have a one to one mapping.

3. The method of claim 1 wherein the first and the second CCEs have the same CCE indices.

4. The method of claim 1 wherein the first and the second CCEs have different CCE indices.

5. The method of claim 1, where each of the first and the second CORESETs comprises a number of orthogonal frequency division multiplexing, OFDM, symbols in time domain and a number of resource blocks in frequency domain.

6. The method of claim 1, wherein the first and the second CORESETs are multiplexed either in time, frequency, or a combination of both time and frequency.

7. The method of claim 1, wherein receiving the first repetition of the PDCCH in the first CORESET and the second repetition of the PDCCH in the second CORESET comprises:

receiving the first repetition of the PDCCH in the first CORESET from a first network node; and receiving the second repetition of the PDCCH in the second CORESET from a second network node.

8. The method of claim 7 wherein the first CORESET is associated with a first TCI state, the second CORESET is associated with a second TCI state, and the first TCI state may be the same or different from the second TCI state.

9. The method of claim 8 wherein the first and the second network nodes are associated with the first and the second TCI states, respectively.

10. The method of claim 1, wherein receiving the first repetition of the PDCCH in the first CORESET and the second repetition of the PDCCH in the second CORESET comprises receiving the first repetition of the PDCCH in the first CORESET and the second repetition of the PDCCH in the second CORESET on different beams from a single network node.

11. The method of claim 10 wherein the first CORESET is associated with a first TCI state, the second CORESET is associated with a second TCI state, and the first TCI state may be the same or different from the second TCI state.

12. The method of claim 1, wherein either a physical downlink shared channel, PDSCH, or a physical uplink shared channel, PUSCH, is scheduled by the DCI.

13. The method claim 12 further comprising determining a time offset between reception of the DCI and the scheduled PDSCH or PUSCH.

14. The method of claim 13 wherein the time offset is between: (a) a last symbol in time from among all symbols of the first repetition of the PDCCH and the second repetition of the PDCCH and (b) a first symbol in time of the scheduled PDSCH or PUSCH.

15. The method claim 12 further comprising determining a reference symbol from among the first repetition of the PDCCH and the second repetition of the PDCCH for the scheduled PDSCH or PUSCH.

16. The method claim 15 where the reference symbol is a first symbol of one of the first repetition of the PDCCH and the second repetition of the PDCCH that starts at a same time or later in time.

17. The method claim 15 the reference symbol is a first symbol of one of the first repetition of the PDCCH and the second repetition of the PDCCH in one of the first and the second CORESETs having a lowest CORESET index.

18. The method of claim 1, wherein either a channel state information reference signal, CSI-RS, or a sounding reference signal, SRS, is triggered by the DCI.

19. The method of claim 18 further comprising determining a time offset between reception of the DCI and the triggered CSI-RS or SRS.

20. The method of claim 19 wherein the time offset is between: (a) a last symbol in time from among all symbols of the first repetition of the PDCCH and the second repetition of the PDCCH and (b) the corresponding one of the CSI-RS or SRS.

21. The method of claim 1, wherein a physical downlink shared channel, PDSCH, is scheduled by the DCI, and the method further comprises determining a physical uplink control channel, PUCCH, resource in a PUCCH resource set for carrying a Hybrid Automatic Repeat Request, HARQ, ACK or NACK associated with the scheduled PDSCH, wherein the PUCCH resource set has more than eight PUCCH resources.

22. The method of claim 21 wherein determining the PUCCH resource comprises determining an index of a first control channel element, CCE, over which the first PDCCH or second PDCCH is transmitted and a total number of CCEs in the first CORESET or the second CORESET over which the first PDCCH or second PDCCH is transmitted.

23. The method of claim 1, wherein the first repetition of the PDCCH and the second repetition of the PDCCH are identical.

24. The method of claim 1, wherein the first repetition of the PDCCH is different from the second repetition of the PDCCH.

25. The method of claim 1, wherein the DCI is one of one or more certain DCI formats for which PDCCH or DCI repetition is allowed to occur.

26. The method of claim 1, wherein a radio network temporary identifier, RNTI, associated to the DCI is one of one or more certain RNTIs for which PDCCH or DCI repetition is allowed to occur.

27. A wireless communication device for reception of physical downlink control channel, PDCCH, repetitions over multiple control resource sets, CORESETs, in a cellular communications system, the wireless communication device comprising:

one or more transmitters;

one or more receivers; and processing circuitry associated with the one or more transmitters and the one or more receivers, the processing circuitry configured to cause the wireless communication device to:

receive a configuration of a first CORESET and a second CORESET;

receive, from one or more network nodes, a first repetition of a PDCCH carrying downlink control information, DCI, in the first CORESET and a second repetition of the PDCCH carrying the same a DCI in the second CORESET, wherein the first and second repetitions of the PDCCH have either: (a) different channel encoding or (b) a same channel encoding, wherein the first and the second repetitions of the PDCCH are transmitted in first control channel elements, CCEs, of the first CORESET and second CCEs of the second CORESET, respectively; and decode the DCI based on the first repetition of the PDCCH and/or the second repetition of the PDCCH.

28. A method performed by a network node for transmission of at least one of two or more physical downlink control channel, PDCCH, repetitions over multiple control resource sets, CORESETs, in a cellular communications system, the method comprising:

transmitting, to a wireless communication device, a configuration of a first CORESET and a second CORESET;

transmitting, to the wireless communication device, at least one of a first repetition of a PDCCH carrying downlink control information, DCI, in the first CORESET and a second repetition of the PDCCH carrying the same DCI in the second CORESET, wherein the first and second repetitions of the PDCCH have either: (a) different channel encoding or (b) a same channel encoding, wherein the first and the second repetitions of the PDCCH are transmitted in first control channel elements, CCEs, of the first CORESET and second CCEs of the second CORESET, respectively.

29. A network node for transmission of at least one of two or more physical downlink control channel, PDCCH, repetitions over multiple control resource sets, CORESETs, in a cellular communications system, the network node comprising:

processing circuitry configured to cause the network node to:

transmit, to a wireless communication device, a configuration of a first CORESET and a second CORESET;

transmit, to the wireless communication device, at least one of a first repetition of a PDCCH carrying downlink control information, DCI, in the first CORESET and a second repetition of the PDCCH carrying the same DCI in the second CORESET, wherein the first and second repetitions of the PDCCH have either: (a) different channel encoding or (b) a same channel encoding, wherein the first and the second repetitions of the PDCCH are transmitted in first control channel elements, CCEs, of the first CORESET and second CCEs of the second CORESET, respectively.

\* \* \* \* \*